(12) United States Patent
Sierra et al.

(10) Patent No.: US 10,419,422 B2
(45) Date of Patent: *Sep. 17, 2019

(54) COMBINED AUTHORIZATION PROCESS

(71) Applicant: Apple Inc., Cupertino, CA (US)

(72) Inventors: Yannick L. Sierra, San Francisco, CA (US); Mitchell D. Adler, Cupertino, CA (US)

(73) Assignee: APPLE INC., Cupertino, CA (US)

( * ) Notice: Subject to any disclaimer, the term of this patent is extended or adjusted under 35 U.S.C. 154(b) by 173 days.

This patent is subject to a terminal disclaimer.

(21) Appl. No.: 14/871,782

(22) Filed: Sep. 30, 2015

(65) Prior Publication Data

US 2017/0012959 A1 Jan. 12, 2017

Related U.S. Application Data

(60) Provisional application No. 62/189,178, filed on Jul. 6, 2015.

(51) Int. Cl.
*H04L 29/06* (2006.01)
*H04L 9/32* (2006.01)

(52) U.S. Cl.
CPC .......... *H04L 63/083* (2013.01); *H04L 9/3215* (2013.01); *H04L 9/3226* (2013.01); *H04L 63/104* (2013.01); *H04L 63/0414* (2013.01); *H04L 2463/082* (2013.01)

(58) Field of Classification Search
CPC .................................................. H04L 63/083
USPC .......................................................... 726/4
See application file for complete search history.

(56) References Cited

U.S. PATENT DOCUMENTS

| | | | |
|---|---|---|---|
| 6,732,144 B1 | 5/2004 | Kizu et al. | |
| 8,245,050 B1 * | 8/2012 | Subramanian | H04L 63/0428 380/277 |
| 8,458,462 B1 | 6/2013 | Hanna | |
| 8,989,706 B2 | 3/2015 | Anathanarayanan et al. | |
| 9,052,861 B1 * | 6/2015 | Pizot | G06F 3/1285 |
| 9,077,759 B2 | 7/2015 | Brouwer et al. | |
| 9,203,824 B1 * | 12/2015 | Nunn | H04L 63/08 |
| 2004/0131187 A1 * | 7/2004 | Takao | H04L 63/0428 380/255 |
| 2007/0033392 A1 | 2/2007 | Ganesan | |
| 2007/0063055 A1 * | 3/2007 | Graf | G06K 7/0004 235/492 |
| 2007/0271234 A1 | 11/2007 | Ravikiran | |
| 2008/0189293 A1 * | 8/2008 | Strandel | G06Q 10/107 |
| 2009/0055464 A1 | 2/2009 | Multer et al. | |
| 2009/0158041 A1 | 6/2009 | Kang et al. | |
| 2009/0228977 A1 | 9/2009 | Lee | |
| 2011/0072274 A1 | 3/2011 | Leoutsarakos et al. | |

(Continued)

*Primary Examiner* — Dant B Shaifer Harriman
(74) *Attorney, Agent, or Firm* — Morgan, Lewis & Bockius LLP

(57) ABSTRACT

Some embodiments provide a method for a first device for joining a group of related devices. The method receives input of a password for authorization with a centralized entity. The method receives input of a code generated by a second device already established in the group of related devices. The method uses the password and the code to (i) join the group of related devices in order to synchronize user data with the devices in the group of related devices and (ii) authorize the first device with the centralized entity as a valid device for a particular account with the centralized entity.

23 Claims, 11 Drawing Sheets

(56) References Cited

U.S. PATENT DOCUMENTS

| | | |
|---|---|---|
| 2011/0252243 A1 | 10/2011 | Brouwer et al. |
| 2011/0302646 A1 | 12/2011 | Ronda |
| 2012/0202428 A1* | 8/2012 | Mirbaha ............... H04L 12/185 455/41.2 |
| 2013/0226799 A1* | 8/2013 | Raj ......................... G07C 9/00 705/44 |
| 2014/0089671 A1 | 3/2014 | Logue et al. |
| 2014/0273854 A1 | 9/2014 | Breckman et al. |
| 2014/0281540 A1 | 9/2014 | Brouwer et al. |
| 2014/0289833 A1 | 9/2014 | Briceno et al. |
| 2014/0379783 A1 | 12/2014 | Tadayon et al. |
| 2015/0026125 A1 | 1/2015 | Sharma |
| 2015/0222615 A1 | 8/2015 | Allian et al. |

\* cited by examiner

COMBINED AUTHORIZATION PROCESS

BACKGROUND

A user that owns multiple devices with overlapping functionality is becoming increasingly common. Smartphones, tablets, and computers all access the web, allow a user to process photos, etc., and users tend to have several such devices. Thus, a user wanting to share data between their devices and have access to data on multiple devices is increasingly common as well. Users may commonly use all sorts of different techniques to transfer data between devices, such as flash memory sticks, e-mail, etc. More efficient techniques for automatically sharing data between a user's devices are desired.

BRIEF SUMMARY

Some embodiments provide a method for enabling a first device to both (i) join a group of related devices in order to synchronize data with the devices and (ii) authorize itself as a valid device for an account with a centralized entity using a single process that only requires a single set of user inputs on the first device and one of the other devices already established in the group of related devices. In some embodiments, the devices in the group of related devices synchronize encrypted user data with each other in such a way that the centralized authority cannot decrypt the user data, even when the user data is synchronized through the centralized authority. Separately, the devices in the group of related devices are logged into an account with the centralized authority, such as a cloud services account, thus providing the devices unified access to the centralized authority.

In some embodiments, the first device (a "requesting device") receives two user inputs in order to perform the combined authorization and synchronization group joining process. The requesting device receives (i) input of a password for the account with the centralized entity and (ii) input of a code generated by a second device already established in the group of related devices, and authorized by the centralized entity (an "accepting device"). This code is generated in a random manner not reproducible by the centralized entity, and thus the centralized entity (through which some embodiments pass messages between the requesting device and accepting device) cannot use the code to illicitly gain access to the synchronization group (i.e., if the centralized entity is taken over and acts maliciously).

The code is generated on the accepting device and input by the user on the requesting device, and proof of the code is sent by the requesting device back to the accepting device, thereby proving to the accepting device that the user is in possession of both devices. Along with this proof, the requesting device also sends to the accepting device its public identity used for the synchronization group, encrypted with a shared cryptographic key (generated, at least in part, based on the password, as well as other inputs that make the key not derivable by the centralized entity). The accepting device decrypts the public identity of the requesting device, and prepares to receive an application to join the synchronization group from the requesting device that uses the same public identity. When this application is received, the accepting device automatically allows the requesting device to join the synchronization group without any further user input (e.g., user approval) required, as this user approval was previously taken care of by the user carrying the code generated by the accepting device to the requesting device.

In addition, the accepting device generates a second code in some embodiments, and sends this to the requesting device (e.g., in encrypted form) after receiving the proof of the first code from the requesting device. This second code is also a random or pseudo-random code, but is generated in such a way that the code (or proof of the code) is reproducible by the centralized entity (e.g., by tying the code in a deterministic manner to a property of the device known to the centralized entity). This second code is used, along with the account password, to authorize the requesting device with the centralized entity. In some embodiments, the centralized entity requires both the password and an additional authentication factor that proves that the user (who set up the account with the centralized entity) is in possession of the requesting device. This second code generated by the accepting device serves as such a second factor.

In some embodiments, rather than the combined synchronization group joining and centralized entity authentication process, the user can carry the second code from the accepting device to the requesting device, and use the code only as a second factor for authentication with the centralized entity. In order for the accepting device to determine whether this code is the first type of code (not reproducible by the centralized entity, used for the combined process) or the second type of code (reproducible by the centralized entity, used only for the authentication process), some embodiments use a marker in the code (e.g., one of the digits) that specifies which type of code it is.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description further describe the embodiments described in the Summary as well as other embodiments. Accordingly, to understand all the embodiments described by this document, a full review of the Summary, the Detailed Description, and the Drawings is needed. Moreover, the claimed subject matters are not to be limited by the illustrative details in the Summary, the Detailed Description, and the Drawings, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purposes of explanation, several embodiments of the invention are set forth in the following figures.

FIG. 5 conceptually illustrates a process of some embodiments performed by an accepting device to allow a requesting device to join a synchronization group of which the accepting device is a part and enable the requesting device to log into a central services account to which the accepting device is already logged in.

DETAILED DESCRIPTION

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Some embodiments provide a method for enabling a first device to both (i) join a group of related devices in order to synchronize data with the devices and (ii) authorize itself as a valid device for an account with a centralized entity using a single process that only requires a single set of user inputs on the first device and one of the other devices already established in the group of related devices. In some embodiments, the devices in the group of related devices synchronize encrypted user data with each other in such a way that the centralized authority cannot decrypt the user data, even when the user data is synchronized through the centralized authority. Separately, the devices in the group of related devices are logged into an account with the centralized authority, such as a cloud services account, thus providing the devices unified access to the centralized authority.

Figure 1:
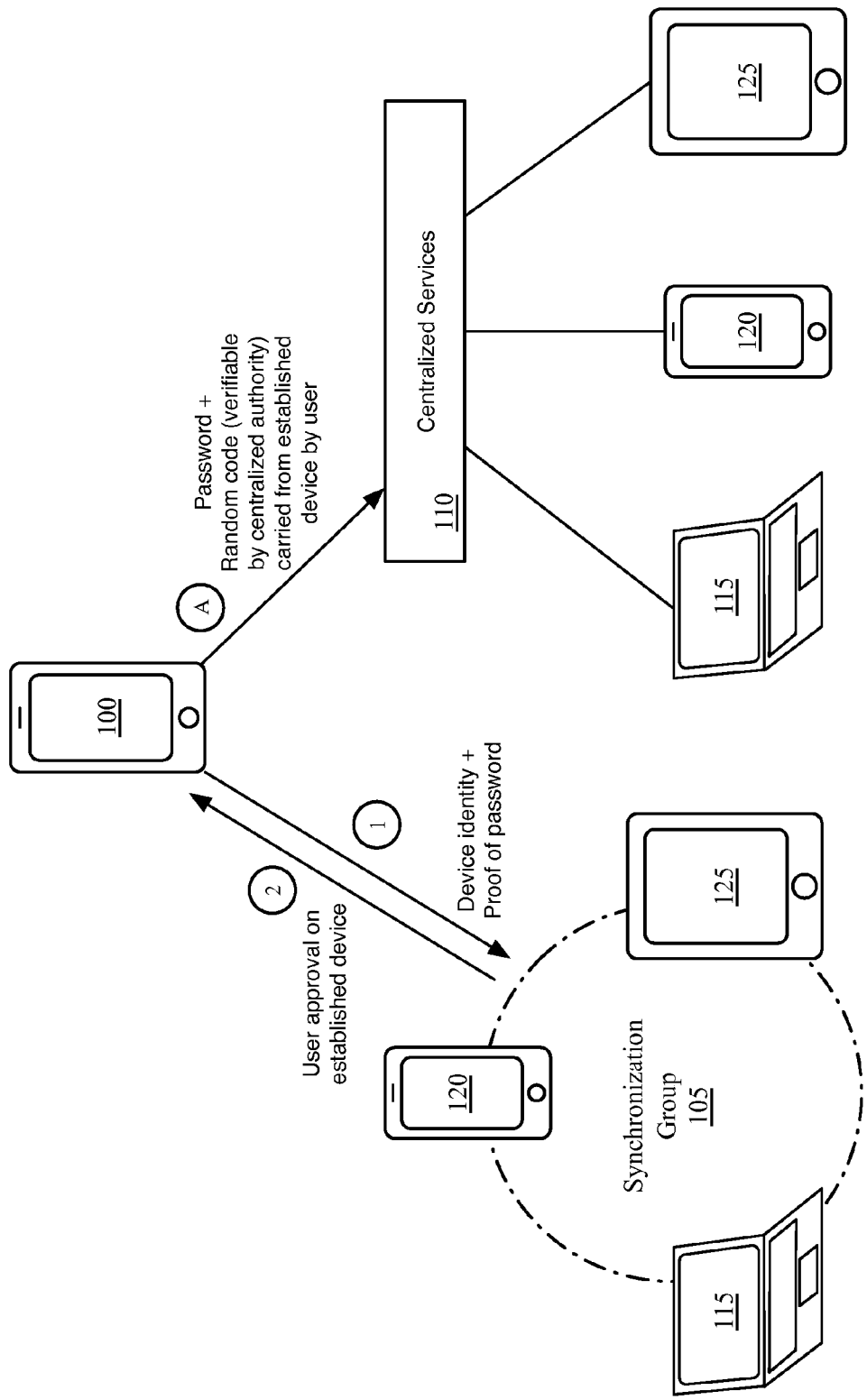
FIG. 1 conceptually illustrates a device separately joining both a synchronization group with three related devices as well as a centralized services (e.g., cloud services) account to which the three related devices belong.

FIG. 1 conceptually illustrates such a device 100 joining both a synchronization group 105 with three related devices 115-125 as well as a centralized services (e.g., cloud services) account to which the three related devices 115-125 belong. This enables the device 100 to synchronize protected user data (e.g., passwords, cryptographic keys, etc.) with the three devices 115-125, as well as log into a user account with the centralized services entity 110.

In this example, the devices 100 and 115-125 may be owned by a single user, and may be all sorts of different types of devices. For instance, this example shows the devices 100 and 120 are smart phones, the device 115 is a laptop computer, and the device 125 is a tablet. However, the devices could also be any other type of electronic device with which a user can log into a centralized user account, such as desktop computers, smart watches or other wearable devices, streaming video set top boxes, etc. In some cases, the user performs the process and/or processes to add the device 100 to the synchronization group and centralized services account when acquiring a new device, or if having reset an existing device.

In FIG. 1, the device 100 uses two separate processes to join the synchronization group 105 and the centralized services account, which require separate user interactions with the devices. First, as shown by the encircled "A", to be authenticated for the account with the centralized services entity 110, the user enters the account username and password on the device 100, which will also ask for a second authentication factor in order for the device to become trusted. In some embodiments, the centralized entity (e.g., a set of verification servers operated by the centralized entity) generates a random or pseudo-random code and sends this to the previously trusted devices 115-125, or either the server or the user commands one of the devices 115-125 to generate such a code. The user then enters this code on the requesting device 100 in order to verify that she is in possession of a valid, trusted device. Some embodiments require the trusted user device to have a device passcode, while other embodiments do not impose such a requirement.

Different embodiments may use different techniques to provide the code that the user is required to enter on the device 100. For instance, some embodiments use a numeric or alpha-numeric code that is sent via a short message service (SMS) message (i.e., a text message) to the trusted device 115-125 of the user, which the user must then enter through a dialog box on the new device. Some embodiments use a phone call to one of the devices 115-125 to provide a similar alphanumeric code. Some embodiments use a Quick Response (QR) code, or similar visual code, and require the user to use the device 100 to photograph the visual code displayed on the trusted device 115-125. In some embodiments, the code is a random number generated based on a seed that is tied to the trusted device 115-125 (and only generated after a user requests the code, possibly requiring that the user also input a passcode of the device). This seed may be tied to a machine identifier, and is also known to the verification servers of the centralized entity. Irrespective of the type of code used, the requesting device 100 sends the code to the server (or proof of the code, such as a hash generated from the code). Only when the server has verified both the password and the code (functioning as a second factor for authentication) do the verification servers allow the new device to access the account.

As a separate process in FIG. 1, the device 100 joins the synchronization group 105. To join the synchronization group, the device 100 sends an application (shown by the encircled "1") to the other devices established in the synchronization group. This application requires the device to provide its identity for use in the synchronization group (e.g., a public key and possibly other data) as well as proof of its possession of the password to the centralized services account (e.g., by signing the application, which includes the device identity, with a cryptographic key derived from at least the password). In addition, in order for the device 100 to join the synchronization group, some embodiments require the user to indicate her approval on one of the established devices 115-125 that are already in the synchronization group. In some embodiments, one or more of the devices 115-125 displays a notification (after the device is unlocked by the user) that the requesting device 100 wishes to join the synchronization group, and requires that the user affirm that the requesting device should be allowed into the group 105. The joining of a synchronization group of some embodiments is explained in detail in U.S. Provisional Patent Applications 62/168,893, filed May 31, 2015, and 62/172,127, filed Jun. 7, 2015, as well as U.S. Patent Publication 2014/0281540 and concurrently filed U.S. patent application Ser. No. 14/872,013, entitled "Synchronization and Verification Groups Among Related Devices". U.S. Provisional Patent Applications 62/168,893 and 62/172,127 as well as U.S. Patent Publication 2014/0281540 and concurrently filed U.S. patent application ** Ser. No. 14/872,013 are incorporated herein by reference.

The process of FIG. 1 requires the user to perform two separate sets of actions in order for the requesting device 100 to join the synchronization group 105 and access the centralized services account 110. First, the user needs to get a code from one of the devices 115-125 and enter that code on the device 100. Separately, the user needs to have the device 100 request to join the synchronization group, then go and approve that device on one of the established devices 115-125.

In some embodiments, however, the requesting device performs a combined authorization and synchronization group joining process, using only two user inputs. The requesting device receives (i) input of the account password and (ii) input of a code generated by a second device already established in the group of related devices, and authorized by the centralized entity (an "accepting device"). This code is generated in a random manner not reproducible by the centralized entity, and thus the centralized entity (through which some embodiments pass messages between the requesting device and accepting device) cannot use the code to illicitly gain access to the synchronization group (i.e., if the centralized entity is taken over and acts maliciously). In this description, that a code is not reproducible by the centralized entity means that the centralized entity does not have the seed data necessary to generate the code that will be displayed at any given time, and cannot brute force recover the code quickly or in a small number of attempts.

Figure 2:
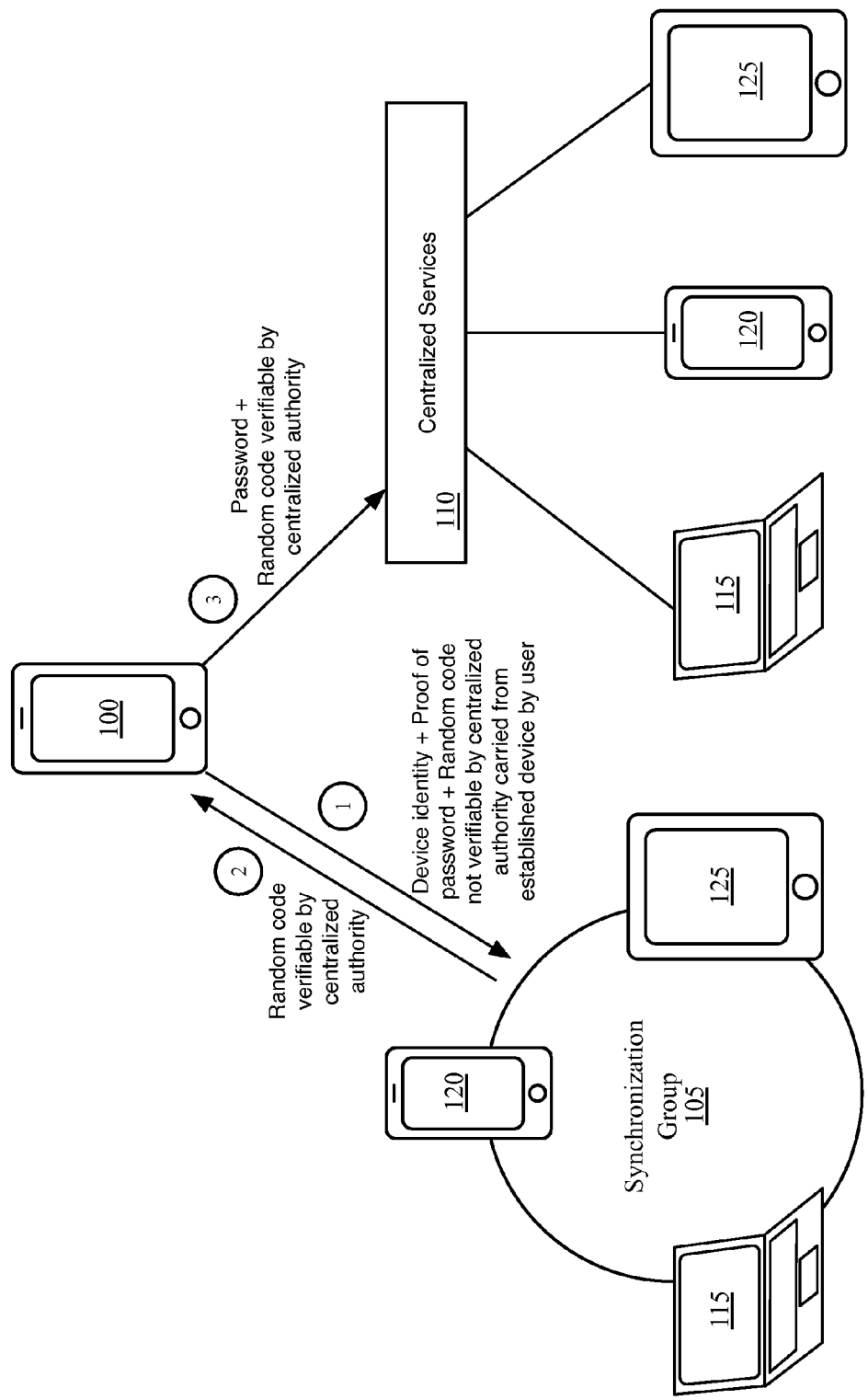
FIG. 2 conceptually illustrates a combined authorization and synchronization group joining process of some embodiments.

FIG. 2 conceptually illustrates such a combined authorization and synchronization group joining process of some embodiments. In this figure, the device 100 joins both the synchronization group 105 and the centralized services account 110, while requiring the user to only input the account password and a code generated and/or displayed on one of the established trusted devices 115-125. This combined process is performed in such a way that even if the centralized services authentication authority were to act maliciously, they would not be able to gain access to the synchronization group 105.

In this case, the user inputs on the requesting device 100 (i) the password of the cloud services account and (ii) a code generated on one of the established devices 115-125 that is not reproducible by the centralized services authentication servers. The code is generated on the established device 115-125 (acting as an accepting device) and input by the user on the requesting device 100, and proof of the code is sent by the requesting device back to the accepting device, thereby proving to the accepting device that the user is in possession of both devices. Along with this proof, the requesting device also sends to the accepting device its public identity used for the synchronization group, encrypted with a shared cryptographic key (generated, at least in part, based on the password, as well as other inputs that make the key not derivable by the centralized entity), as shown by the encircled "1". The accepting device decrypts the public identity of the requesting device 100, and prepares to receive an application to join the synchronization group from the requesting device that uses the same public identity.

When this application is received, the accepting device automatically allows the requesting device 100 to join the synchronization group 105 without any further user input (e.g., user approval) required, as this user approval was previously taken care of by the user carrying the code generated by the accepting device to the requesting device.

In addition, the accepting device generates a second code in some embodiments, and sends this second code to the requesting device (e.g., in encrypted form) after receiving the proof of the first code from the requesting device, as shown by the encircled "2". This second code is also a random or pseudo-random code, but is generated in such a way that the code (or proof of the code) is reproducible by the centralized services entity (e.g., by tying the code in a deterministic manner to a property of the device known to the centralized entity). This second code is used, along with the account password, to authorize the requesting device with the centralized services entity, as shown by the encircled "3". In some embodiments, the centralized services entity requires both the password and an additional authentication factor that proves that the user (who set up the account with the centralized services entity) is in possession of the requesting device. This second code generated by the accepting device serves as such a second factor.

In some embodiments, rather than the combined synchronization group joining and centralized entity authentication process, the user can carry the second code from the accepting device to the requesting device, and use the code only as a second factor for authentication with the centralized services entity (i.e., as shown in FIG. 1, without joining the synchronization group). In order for the accepting device to determine whether this code is the first type of code (not reproducible by the centralized services entity, used for the combined process) or the second type of code (reproducible by the centralized services entity, used only for the authentication process), some embodiments use a marker in the code (e.g., one of the digits) that specifies whether the code is for use in the combined synchronization group joining and authorization process, or is for use as a second authentication factor only.

The above describes examples of the device authentication system of some embodiments. Several more detailed examples are described below. Section I describes the combined authorization process of some embodiments. Next, Section II describes the determination as to whether an input code is for use in the combined process or only an account authentication process. Section III then describes software architecture of a device that can act as either a requesting device or accepting device. Finally, Section IV describes an electronic system with which some embodiments of the invention are implemented.

I. Combined Authorization Process

Figure 3:
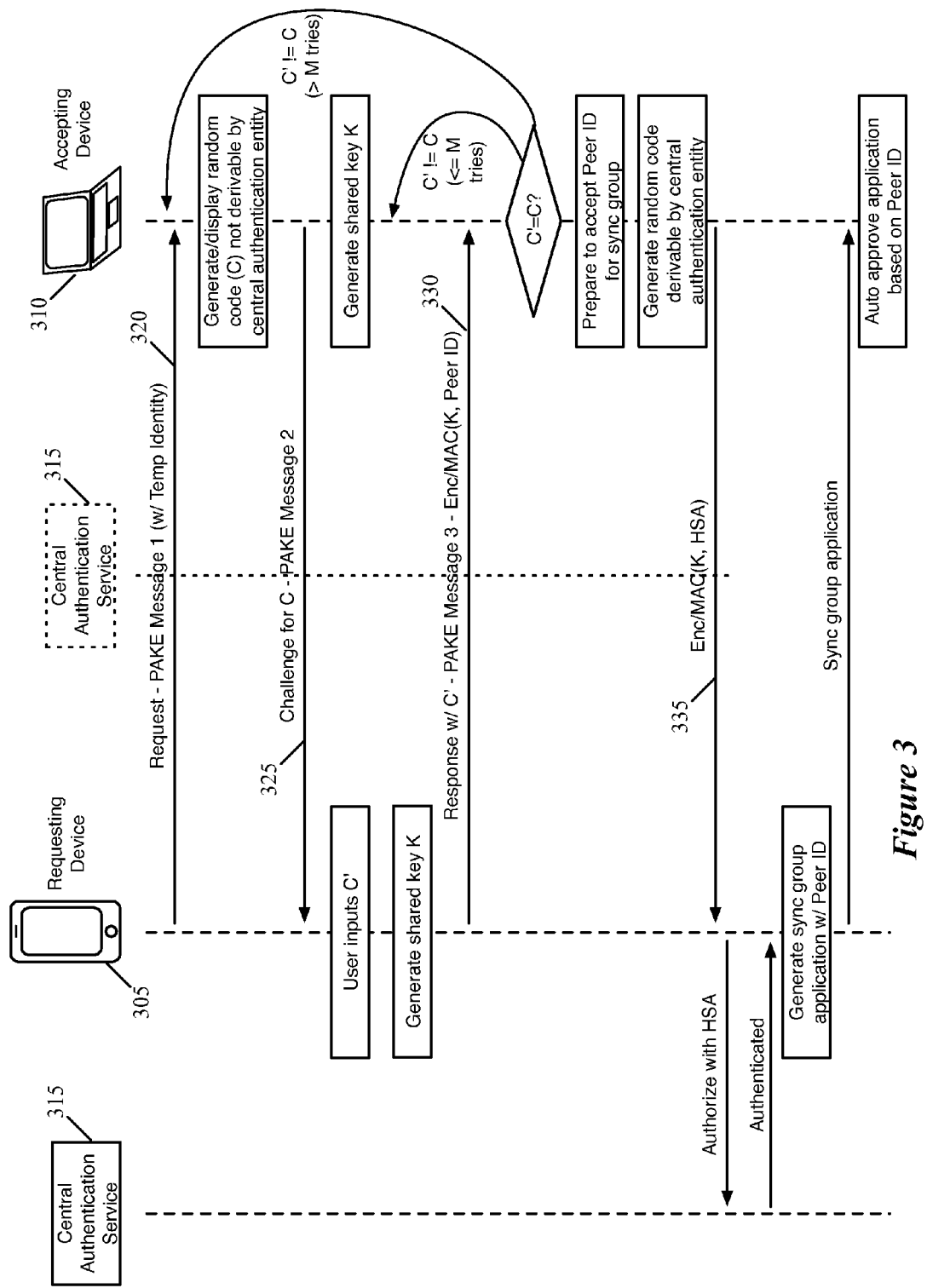
FIG. 3 illustrates the interactions between a first requesting device and a second accepting device, as a flow diagram showing the messaging between these two devices as well as with a central authentication server (or set of servers).

As mentioned, some embodiments provide a method for enabling a first device to both (i) join a group of related devices in order to synchronize data with the devices and (ii) authorize itself as a valid device for an account with a centralized entity using a single process user interaction process. This process requires only a single set of user inputs on the first device and one of the other devices already established in the group of related devices. FIG. 3 illustrates the interactions between a first requesting device 305 and a second accepting device 310, as a flow diagram showing the messaging between these two devices as well as with a central authentication server 315 (or set of servers).

The central authentication server 315 is representative of one or more servers that handle authentication for a centralized entity. In some embodiments, the entity provides cloud services (e.g., cloud storage, subscription services, etc.) and the devices register for the cloud services via the authentication servers 315. In addition, in some embodiments, these authentication servers serve as an intermediary between the requesting device 305 and the accepting device 310. That is, rather than passing messages directly to each other, the devices 305 and send messages through the authentication servers 315, with which they both communicate. The devices use a password-authenticated key exchange (PAKE), as shown in FIG. 3, which prevents man-in-the-middle style attacks by the authentication service. In other embodiments, devices communicate directly with each other (e.g., via a short-range wireless protocol such as Bluetooth).

In the illustrated example, the accepting device 310 is already authenticated with the central authentication service 315 as a trusted device for a particular user account, and is part of a synchronization group with some or all of the devices authenticated with the central service for the user account. In addition, by the stage shown at the start of the flow diagram, the user would have entered the central authentication service password (or other credential) on the requesting device 305, and indicated (if necessary) for the requesting device to join the synchronization group. In some embodiments, when the user enters the authentication service account identifier (e.g., username, e-mail address, etc.) and password on a new device (e.g., a device that is brand new to the user, or which has been reset and is no longer setup for synchronization and/or access to the centralized services), the authentication service provides the device with the ability to contact the other devices belonging to the same account.

As shown, the requesting device 305 sends a first PAKE message 320. In some embodiments, although this flow diagram shows the messages between the requesting device 305 and a single accepting device 310, the requesting device actually sends this initial message to all of the devices that are part of the synchronization group. In some embodiments, the specific PAKE protocol used is the Secure Remote Password (SRP) protocol, which is an augmented PAKE protocol that creates a large private key shared between the two parties (the requesting and accepting devices 305 and 310).

In this first message 320 of some embodiments, the requesting device 305 (acting as the client in the PAKE) generates a first value $A=g^a \% N$, and sends this value A (a client public key value) to the accepting device 310. In this calculation, N and g are group parameters (N being a large safe prime with all arithmetic for the key exchange computed in the ring of integers module N, and g being a generator of the multiplicative group), while a is a random number (e.g., at least 128 or 256 bits in length). In addition, the requesting device 305 sends a temporary device identity in some embodiments. This is an identity used by the device only temporarily for the purpose of initiating the combined authorization and synchronization group joining process, and is different than the identity used later to actually join the group.

As mentioned, in some embodiments the requesting device 305 actually sends this message 320 to several devices (if several devices are registered for the user account with the authentication service 315). Upon a user unlocking the accepting device 310 (though shown in this case as a laptop, the accepting device could just as easily be another phone, a tablet, a desktop, etc.), the accepting device generates and displays a random code (C), which is not derivable by the central authentication entity (i.e., without using brute force tactics to which the process is designed to be resistant). This code is generated in a random or pseudorandom manner based on a secure seed in the accepting device 310, and is not tied in any way to a property of the device 310 known to the central service.

The code is then used as an input to create the second PAKE message 325 sent to the requesting device 305. In some embodiments, to generate a server public key B, the accepting device 310 first calculates a verifier value $v=g^x \% N$, with $x=Hash(s|Hash(I":"|C))$. Some embodiments use an SHA hash (e.g., SHA256, SHA1, etc.) for the hash function, with s being a random salt, I being the cloud services username, and C being the generated code. Next, the accepting device 310 uses the verifier value v to calculate the server public key $B=k*v+g^b \% N$, with b as a random number (e.g., of the same length as a) and $k=HASH(N|Pad(g))$ (the Pad( ) function of some embodiments converts an integer to a byte string, and left-pads the byte string with 0s as necessary). Some embodiments then send this value B as the second PAKE message 325. This second message 325 serves as a challenge for the code C, the input of which on the requesting device is central to the joint process.

Typically, unless the user unlocks multiple possible accepting devices to get codes from each of them, the requesting device 305 will only receive a challenge message 325 from one accepting device 310. At this point, the user enters the code C' (if entered correctly, C'=C). Different embodiments may use different techniques to provide this code C that the user is required to enter on the new device. For instance, some embodiments simply display an alphanumeric (or just numeric) code, which the user types on the requesting device. Other embodiments use a Quick Response (QR) code, or similar visual code, and require the user to use the new device to photograph the visual code displayed on the trusted device. Still other embodiments use audio, a set of device movement commands (which only work in the cases that the new device has an accelerometer and/or gyroscope that can detect movements accurately), or other codes that can (i) be replicated on the requesting device and (ii) can be translated into a number useable for the PAKE cryptographic calculations.

At this point, both the requesting and accepting devices 305 and 310 have the information necessary to generate a shared key K, also called a session key. Different embodiments may use different techniques to generate this shared key. In some embodiments, the session key is derived using a key derivation function, such as the HMAC-based Extract-and-Expand Key Derivation Function (HKDF). This HKDF, in some embodiments, provides the same session key on both the requesting and accepting devices 305. In some embodiments, the session key K is based on the transmitted public key values A and B, as well as the values I, P, N, g, and most importantly the code C. Thus, if the code C' is entered incorrectly on the requesting device 305, the shared key will not match and the operations will fail.

The requesting device, using the shared key K and the input code C', sends a PAKE message 330 to verify that the code was entered correctly. In some embodiments, this message 330 includes (i) an answer to the challenge for the input code sent in the second message 325 and (ii) the peer identity of the requesting device 305 encrypted with the shared key K. In some embodiments, the answer to the challenge is a proof of possession of the input code C', such as a value derived from the input code C' (e.g., a hash value generated from the input code). Using a hash value or other value generated from a one-way function prevents a man in the middle attack in which the centralized entity intercepts the code and uses the code to introduce an unauthorized device as a requesting device.

The peer identity of the requesting device 305, in some embodiments, includes a device public key used to identify the device. The peer identity may also include other identifying information, such as a name of the device, a device authentication code derived cryptographically from device hardware information, etc. Some embodiments encrypt this peer identity with a symmetric key encryption function, such as AES, using the shared key K as the encryption key. Other embodiments use unidirectional keys for each of the two directions, which are derived from K (i.e., a first key K_1 for messages sent from the requesting device 305 to the accepting device 310, and a second key K_2 for messages sent in the opposite direction).

Upon receiving the response message 330, the accepting device 310 determines whether the input code C' matches the generated code C. When the requesting device 305 sends data generated based on input code C' (e.g., a hash value), the accepting device performs the same computations 310 to generate data based on the generated code C. If these values match, then the accepting device concludes that the user is in possession of both devices and has entered the code correctly.

However, if the input code does not match the generated code, then the user will have to input the code again. In some embodiments, the accepting device only allows a threshold number of attempts at a particular code, to prevent any sort of brute force guessing of the code. Thus, the accepting device performs different actions next depending on the number of failed attempts at a particular code that it generated. As shown, if the number of attempts is less than the threshold M, then the accepting device 310 awaits another attempt at the code, in which case the user enters a new code C' on the requesting device 305, in hopes that this time C'=C. However, if the threshold number of attempts have been made at the first code, then the device generates and displays a new random code (again, not derivable by the central authentication entity), and resends a new message 325. In addition, in some embodiments, the accepting device 310 sends an error message to the requesting device 305 (not shown) each time a message 330 is received from the requesting device with an incorrect code attempt. This error message causes the requesting device 305 to return to its state after receiving the second message 325. Other embodiments, however, only send such an error message when the accepting device re-generates a new code.

Once the code has been correctly input on the requesting device 305 and verified by the accepting device 310, the accepting device also decrypts the peer identity sent with the message (e.g., using the same shared key K or portion K_1 of the shared key as was used to encrypt the peer identity, in the case of symmetric encryption). The accepting device 305 also generates a new random code HSA derivable by the central authentication entity. This random code, referred to as a second factor authentication code, is generated based on a seed data known to the central authentication service 315, and thus differs from the random code C. The seed data is specific to the device, and in some embodiments the code HSA generated from the seed data varies randomly over time in a deterministic manner reproducible by the central authentication entity. The accepting device sends a message 335 with this new code HSA encrypted using the session key K (or the portion K_2 used for sending messages in this direction). In some embodiments, this code is encrypted in the same manner as the peer identity (e.g., using a symmetric encryption function such as AES).

Because the code HSA is reproducible by the central authentication service 315, the requesting device can use this code to authenticate itself with this service, using the code as a second authentication factor (in addition to the password entered at the start of the process) to prove that the user of the accepting device 310 is also the user of the requesting device 305. In some embodiments, when not using the combined authentication and synchronization group joining process, the accepting device displays the code HSA (rather than the code C), and the user enters this code on the requesting device in order to complete the two-factor authentication with the central authentication service. As described in greater detail below, some embodiments use a flag in the entered code so that the requesting device knows whether the entered code should be sent to the authentication service or to an accepting device (as in message 330).

As shown, having received the code HSA from the accepting device 310, the requesting device decrypts this code (using either the shared key K or the portion K_2 used for transmission from the accepting device to the requesting device) and uses the code to authenticate itself with the central authentication service 315. In some embodiments, this grants the device 305 access to the user's cloud services account. The device uses the cloud services account name and password to identify the account and provide an initial authentication factor, then uses the HSA code as a second authentication factor to prove that the user of the requesting device 305 is in possession of at least one trusted device associated with the account. The authorization attempt message 340 sent to the authentication service 315 and the authentication verification message 345 received in reply may be single messages or representative of several messages sent back and forth between the requesting device and the authentication service in different embodiments.

After having been authorized with the central authentication service 315 to access the user account with the central entity, the requesting device 305 generates an application to join the synchronization group, using the peer identity sent to the accepting device 310 as part of the message 330. In some embodiments, the application is signed with two private keys, for which the accepting device has the public key (and can therefore verify the signatures). These private keys include a user key and a device key. The user key, in some embodiments, is generated (at least in part) based on the central authentication service password, which is known to the accepting device 310. The device key is generated based on random seed data specific to the requesting device 305, and the public key used to verify the signature is also part of the peer identity in some embodiments (so that the accepting device already has this public key and can therefore verify the signature). The accepting device 310 is already prepared to automatically approve this application so long as the signatures are correct and the peer identity matches that which was previously received during the PAKE messages, and thus approves the application of the requesting device without any additional user input (i.e., the user approval of the requesting device is handled by the input of the code C on the requesting device earlier). The synchronization group joining application process of some embodiments is described in more detail in U.S. Provisional Patent Applications 62/168,893 and 62/172,127, as well as U.S. Patent Publication 2014/0281540 and concurrently filed U.S. patent application Ser. No. 14/872,013, entitled "Synchronization and Verification Groups Among Related Devices", all of which are incorporated by reference above.

A. Requesting Device Process

Figure 4:
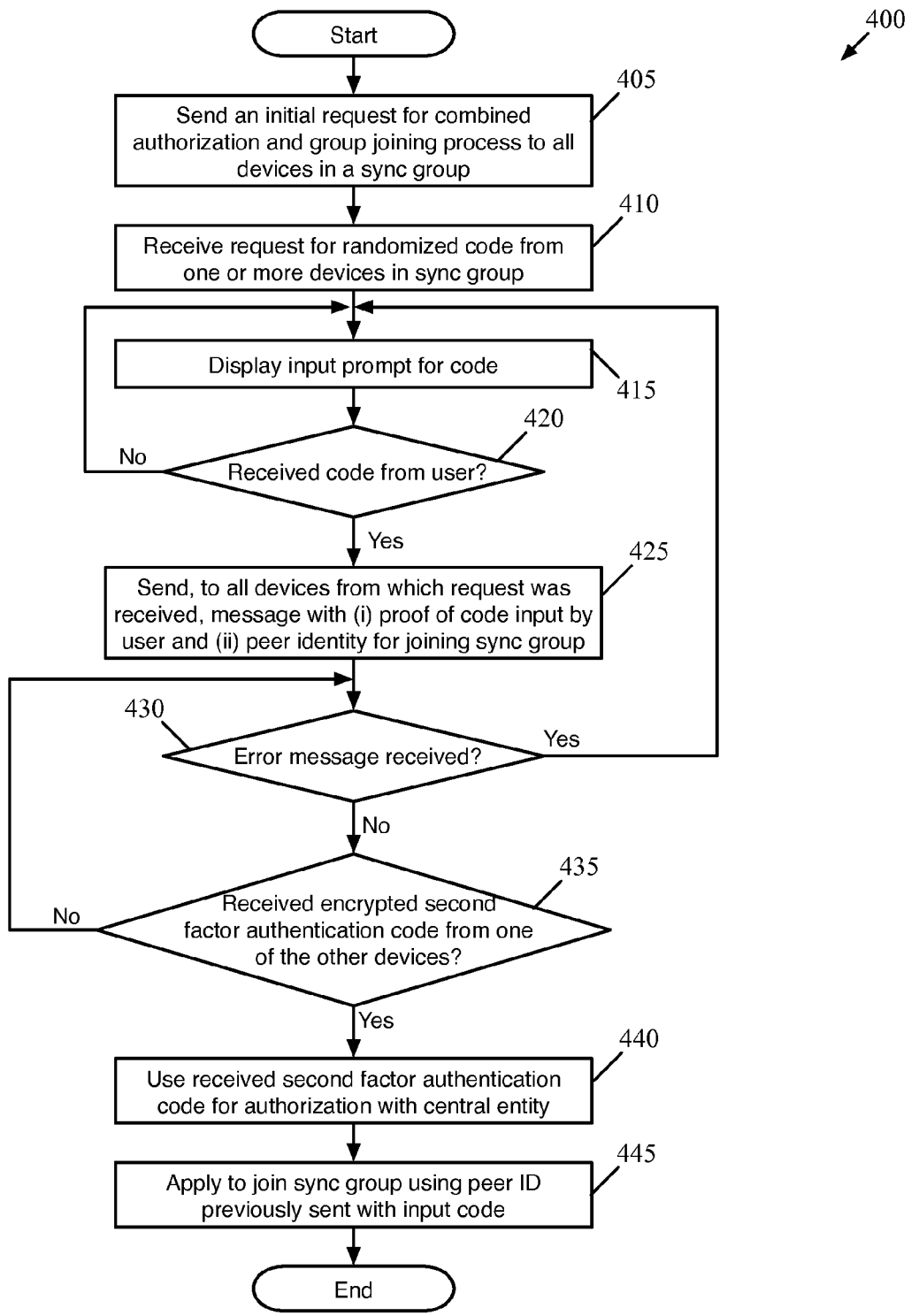
FIG. 4 conceptually illustrates a process of some embodiments performed by the requesting device to both join a synchronization group and be authorized for an account with a central service entity.

FIG. 4 conceptually illustrates a process 400 of some embodiments performed by the requesting device (e.g., the device 305) to both join a synchronization group and be authorized for an account with a central service entity. In some embodiments, the process 400 is performed at the time of device setup—e.g., when a user acquires a new device, resets to original settings on an existing device, etc. In other embodiments, the process 400 begins at the behest of a user after the device has been set up (for instance, if the user did not want to have the device join the synchronization group and log into the centralized entity at the time of device setup).

As shown, the process 400 begins by sending (at 405) an initial request to start the combined authorization and synchronization group joining process to all of the devices in the sync group. In some embodiments, by this time the user would have entered the username and password for the central service entity (e.g., a cloud services entity) on the requesting device. This grants the device access to learn the identities of the other devices associated with the username by the central service entity in some embodiments, allowing the requesting device to send the initial request message to each of these devices. In other embodiments, the device sends the message to the authentication service of the central service entity, which distributes the message to the other devices. As described above, in some embodiments the device calculates a first value $A=g^a \% N$, and sends this value A (a client public key value) to the other devices in the synchronization group. In addition, the requesting device sends a temporary device identity along with the initial request message in some embodiments. This is an identity used by the device only temporarily for the purpose of initiating the combined authorization and synchronization group joining process, and is different than the identity used later to actually join the group.

Next, the process receives (at 410) a request for a randomized code value from one or more devices in the synchronization group. In some embodiments, each of the devices to which the message was sent may send such a request (i.e., the request described above as the second message 325). However, the devices only send such a request if the user turns on and unlocks the device, prompting the device to display the randomized code and send the challenge message to the requesting device. Typically, the user will only go to one of her existing devices to generate the code, and thus only one request will be received. However, in some cases, multiple such request messages are received. As described above, in some embodiments the received request message includes a server public key value B, calculated as $B=k*v+g^b \% N$ by the device from which the request message is received.

The process 400 also displays (at 415) an input prompt for a code (e.g., a box into which the user can type the code, whether through a keyboard, touchscreen, or other input device), and waits for the user to provide a code attempt as input. Some embodiments display this input prompt irrespective of whether a request (second PAKE message) has been received, displaying the prompt as soon as the initial request has been sent at 405. The process determines (at 420) whether code has been input, and continues to display the prompt (at 415) until such input is received (or until the user cancels the operation, which is not shown in the flow chart). Though shown as a determination (at 420), one of ordinary skill will recognize that some embodiments do not make such a repeated determination operation, but instead enter a wait state until the user enters the code, which prompts subsequent operations of the device.

Upon receiving the code, the process sends (at 425), to all of the devices from which a request was received, a message that includes (i) a proof of the code input by the user (e.g., a value derived from this code) and (ii) a peer identity for joining the synchronization group. As described above by reference to FIG. 3, in some embodiments the peer identity is encrypted with a symmetric key derived in part from the code input by the user. In some embodiments, the user specifies on which device the input code was generated and displayed, and the message is only sent to that device at 425. However, in other embodiments, the process does not know from which device this message was received, and therefore sends the message at 425 to all of the devices to which the initial request was sent at 405.

The device then awaits to receive the next response from an established accepting device. As shown, the process determines (at 430) whether an error message was received. When the user inputs the code incorrectly into the requesting device and this device sends the incorrect code to the accepting device at 425, then the accepting device returns an error message in some embodiments. Upon receiving this error message, the process returns to 415 to display the prompt and receive another attempt to input the code. Though not shown, if the user inputs the wrong code at least a threshold number of times, the accepting device will generate a new random code, in order to thwart any brute force attempt at the code.

However, assuming no error message is received, the device also determines (at 435) whether a message with an encrypted second factor authentication code has been received from one of the other devices already established in the synchronization group (i.e., one of the devices to which the input code was sent at 425). This message is only received if the code is entered correctly at operation 420 and sent to the accepting device on which the code was generated. The second factor authentication code, in some embodiments, is similar to the code displayed by the accepting device and entered at 420, but is reproducible by the authentication servers. This second factor authentication code is generated based on a seed data known to the central authentication service, and thus differs from the random code entered by the user. The seed data is specific to the device, and in some embodiments the code generated from the seed data varies randomly over time in a deterministic manner reproducible by the central authentication entity.

If neither an error message nor a message with the second factor authentication code, the process 400 returns to 430 (i.e., continues to wait for a reply). One of ordinary skill will recognize that, again, this is a conceptual representation of the process performed by the requesting device. For instance, even if the requesting device receives multiple challenge requests, then it will send the input code to multiple possible accepting devices, and the code will be incorrect for at least one of these possible accepting devices. Some embodiments only return to 415 if error messages come from all of the devices to which the code was sent. In other embodiments, if an error message is received from a first device, the process 400 returns to 415, but cuts out to operation 440 if a message with a second factor authentication code is subsequently received.

Once the second factor authentication code is received, the process 400 uses (at 440) the received second factor authentication code to authorize itself with the central entity (e.g., the cloud services entity). The process, in some embodiments, uses the cloud services account name and password (input prior to the start of process 400) to identify the account and provide an initial authentication factor, then uses the newly received code as a second authentication factor to prove that the user of the requesting device is in possession of at least one trusted device associated with the account.

Next, having been authorized with the central authentication server, the process 400 applies (at 445) to join the synchronization group using the peer identity previously sent with the input code at 425. As described above by reference to FIG. 3, in some embodiments the process 400 signs this application with (i) a private user key based, at least in part, on the central services account password, and (ii) a private device key generated based on random seed data on the requesting device. Though not shown, assuming the signatures are correct and the peer identity matches that sent at 425, the accepting device automatically approves this application without user input, and notifies both the requesting device and the other devices in the synchronization group, so that the requesting device can receive shared synchronization data from the other devices.

B. Accepting Device Process

Figure 5:
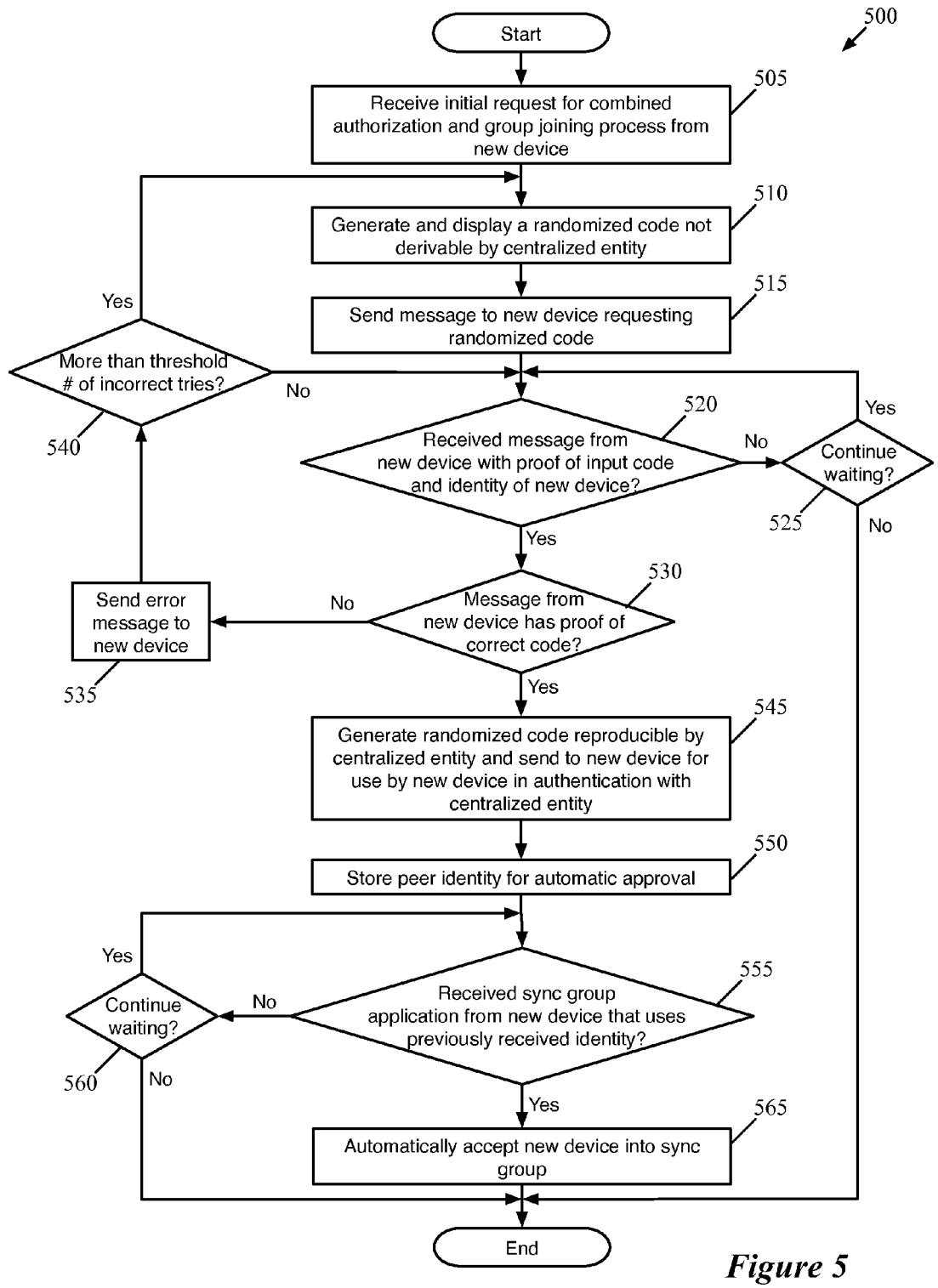

FIG. 5 conceptually illustrates a process 500 of some embodiments performed by an accepting device (e.g., the device 310) to allow a requesting device to join a synchronization group of which the accepting device is a part and enable the requesting device to log into a central services account to which the accepting device is already logged in. As shown, the process 500 begins by receiving (at 505) an initial request for a combined authorization and group joining process from a new device. As noted above, the new device may be a brand new device for the user, or the user may have reset the device operating system, such that the device is effectively new and must rejoin the synchronization group and central services account. The request message, in some embodiments, is the first message of a PAKE, and includes a client public key value A calculated as $A=g\^a \% N$ and described in greater detail above by reference to FIG. 3.

After receiving the request message from the new device, the process 500 generates and displays (at 510) a randomized code not derivable or reproducible by a centralized authentication entity. In some embodiments, the messages are sent through the centralized authentication servers (that authenticates the login credentials for the centralized entity), and thus (i) a PAKE is used to avoid man-in-the-middle attacks and (ii) a random code is generated in such a way as to preclude the centralized authentication entity from using the code, combined with knowledge of the user account name and password, to join the synchronization group and receive access to the user's secure data. In some embodiments, as a further security measure, the accepting device performing the process 500 requires the user to input a device passcode before displaying a random code at 510. This makes it more difficult for an unauthorized user to get a code used for joining a synchronization group and the central services account.

In addition to generating and displaying the randomized code, the process sends (at 515) a message to the new device requesting the randomized code (or requesting proof of the code). In some embodiments, this message includes a server public key value B for the PAKE, calculated as $B=k*v+g\^b \% N$, as described above. This message prompts the requesting device to display an input dialog for the user to input the code displayed by the accepting device in some embodiments (in other embodiments, the requesting device displays the input dialog irrespective of whether the message is actually received from an accepting device), and send back either the input code itself or data derived from the code that can be used as proof of the input code to the accepting device.

After sending the challenge message to the requesting device, the process 500 awaits a message from the requesting device containing the code input on that device or a proof derived from the input code. Thus, the process determines (at 520) whether a message has been received from the new device with a proof of the input code (e.g., a value derived from the input code). If no such message has been received, the process determines (at 525) whether to continue waiting for such a message. If the process should not continue waiting, the process 500 ends. Otherwise, the process returns to 520 to continue awaiting a message from the new device. The process may end prematurely if, e.g., the user cancels the operation, powers off the accepting device performing the process 500, etc. In addition, one of ordinary skill in the art will recognize that this is a conceptual process, and that the process running on the accepting device would essentially enter a wait state until the message is received from the requesting device, causing the accepting device to proceed to operation 530.

When the process 500 does receive a message from the new requesting device, the process determines (at 530) whether the new device has received a correct proof of the code (i.e., the code displayed by the device at 510). As described above, in some embodiments the new device sends a value generated from the input code (e.g., a hash value generated from the code) rather than the code itself. In this case, in order to determine whether the input code on the new device is correct, the accepting device performs the same computation to generate the proof from the displayed random code, and determines whether this matches the received proof When the accepting device determines that the input code does not match the code that it generated, the process sends (at 535) an error message to the new device to indicate that the code was incorrect and that the user should re-enter the code on the device. The process 500 also determines (at 540) whether the code has been input incorrectly more than a threshold number of times. Some embodiments only allow the user to make a certain number of attempts (e.g., 2, 3, 5, 10, etc.) at inputting a particular generated code, so as to eliminate brute force guessing at the code. As such, if the accepting device has received more than the threshold number of messages indicating code input attempts, the process returns to 510 to generate and display a new random code, and send another challenge message to the new device with a new server public key B (computed using the new random code). If the number of attempts at the current code is less than the threshold amount, the process returns to 520 to await another message with an attempt at the current code.

On the other hand, if the message from the new device indicates that the user has input the code correctly on the new device, the process 500 proceeds based on the premise that the user has proven possession of both devices. Thus, the process 500 generates (at 545) a randomized code reproducible by the centralized entity, and sends this new randomized code to the new device for use in authenticating the new device with the centralized entity. As described above, in some embodiments the accepting device encrypts this randomized code with the shared session key K or a portion K_2 of the shared key used for messages from the accepting device to the requesting device, before sending the code.

The randomized code generated at 545 is also referred to as a second factor authentication code, because it is used, along with the username and password of the centralized services account (the first authentication factor), to authenticate the device with the centralized services entity. The second factor authentication code, in some embodiments, is similar to the code generated at 510, but is reproducible by the authentication servers. This second factor authentication code is generated based on a seed data known to the central authentication service, and thus differs from the first random code that is not derivable by the centralized entity. The seed data is specific to the device, and in some embodiments the code generated from the seed data varies randomly over time in a deterministic manner reproducible by the central authentication entity.

The process also decrypts and stores (at 550) the peer identity received at 520, which identifies the new requesting device, for automatic approval. This peer identity information is stored by the device (in some embodiments, for a limited period of time), so that when the new device applies to join the synchronization group, the accepting device can automatically allow the new device into the group without additional user input.

The process 500 then determines (at 555) whether it has received a synchronization group application from the new device that uses the previously received and stored peer identity. At this point, the new device would have used the second factor authentication code to log into the central services account, and then sends the application to the accepting device. In some cases, the receipt of the synchronization group joining application may come a substantial amount of time after the initial PAKE process (and is transmitted in a separate manner from the PAKE messages). When the application has not been received, the process determines (at 560) whether to continue waiting. For example, if a timeout period exists for auto-approval, and that timeout is reached, the process ends. Otherwise, the process continues to await receiving a synchronization group application at 555.

When the synchronization group application is received from the new device with the correct peer identity, the process automatically accepts (at 565) the new device into the synchronization group without any additional user input. The device does still ensure that the application is correctly signed (e.g., with the private user key generated from the account password and the private device key that corresponds to the public key that is part of the peer identity). The process then ends, having allowed the new device into the synchronization group.

C. User Interactions in Combined Process

Figure 6A:
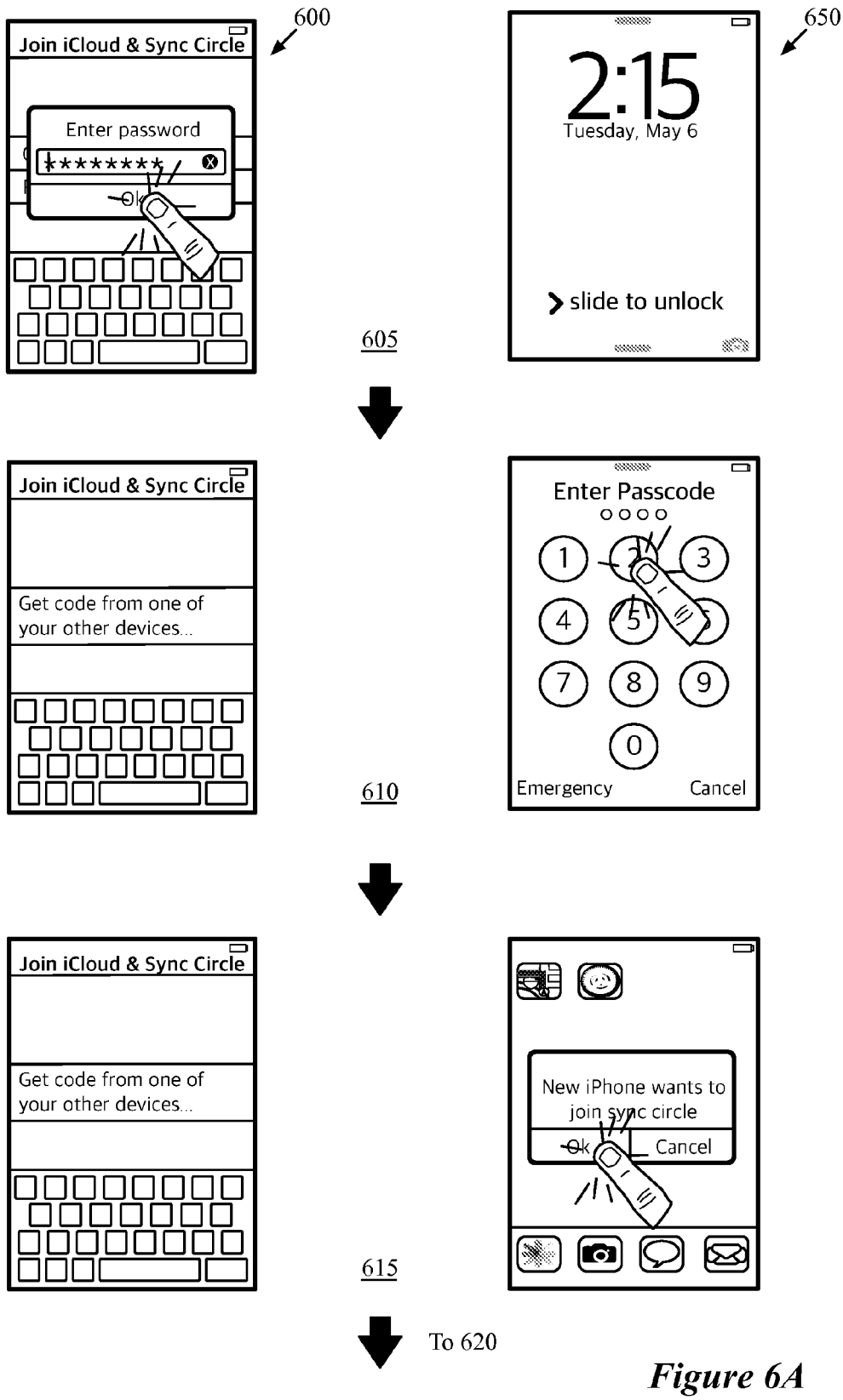
FIGS. 6A-B illustrate the user interfaces of a requesting device and an accepting device as the devices perform the combined synchronization group joining and account authorization process of some embodiments.
Figure 6B:
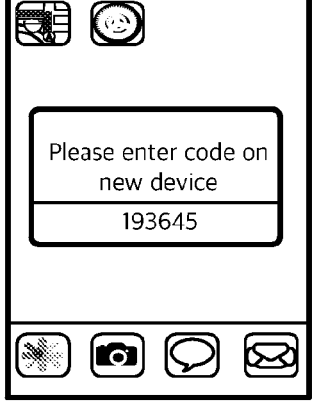
Figure 6B:
Figure 6B:
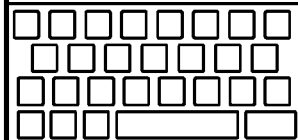
Figure 6B:
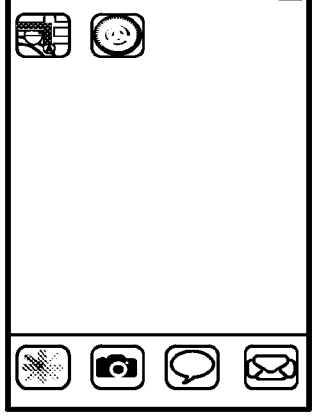

FIGS. 6A-B illustrate the user interfaces of a requesting device 600 and an accepting device 650 over six stages 605-630, as the devices perform the combined synchronization group joining and account authorization process of FIG. 3. In this example, the requesting device 600 is shown on the left side of each stage and the accepting device 650 is shown on the right side of each stage. In the illustrated case, both of the devices are the same type of device (smartphones); as shown above, the two devices may be different types of devices in some cases (e.g., one or both of the devices could be a tablet, smart watch, laptop, desktop, etc.).

As shown, at the first stage 605 the user is setting up the requesting device 600, entering the account password (having already entered the user name) as part of the combined cloud services (iCloud) account and synchronization group (sync circle) joining process. One of ordinary skill will recognize that the user interfaces shown in this figure are merely examples, and that different embodiments may display the various features differently (e.g., inputting the username and password through the same dialog box). In addition, many features unrelated to the present invention are left out of the UI for simplicity. Currently, the accepting device 650 is shown as locked, and the user is not yet interacting with the device.

After the user enters the password on the requesting device 600, the device sends the first PAKE message (e.g., message 320) to the second device (as well as to any additional devices associated with the cloud services account). The user then selects one of the other already trusted devices for the account to use as the accepting device, in this case the device 650. As shown in the second stage 610, the user unlocks the accepting device 650 in order to begin the acceptance process on the device. The requesting device 600 is in a wait state at this point.

In the third stage 615, the accepting device 650 has been unlocked, and prompts the user that a new device (New iPhone) wants to join the synchronization group. In some embodiments, the user is provided with options to either accept the new device (thereby allowing the combined process to continue) or cancel the process, preventing the new device from joining (e.g., if the user has not actually started the process on a new device and believes that this is a malicious attempt to join the synchronization group. In this case, the user selects the "okay" option to continue the process. In some embodiments, the accepting device 650 provides additional data about the device that is attempting to join. For instance, in some embodiments the user can access a map (either as part of the initial UI, or by providing input) that shows the location of the requesting device. This provides the user with additional information as to whether the request should be approved and a code generated. In some embodiments, this additional information is also provided for the separate account access and synchronization group joining flows, as shown in FIG. 1.

As such, the accepting device 650 displays a randomized code at the fourth stage 620. This randomized code is generated in such a way as to not be reproducible by the cloud services authentication servers, as the code will allow synchronization group joining in addition to access to the cloud services account. In addition to displaying the randomized code, the requesting device will have generated the second PAKE message and sent this to the requesting device 600. The requesting device 600 therefore displays a UI that allows the user to enter the authorization code. In other embodiments, the requesting device 600 displays this UI starting at stage 610 (i.e., as soon as it sends the first PAKE message), or a fixed amount of time after sending the first PAKE message.

In the next stage 625, the user enters the authorization code on the requesting device 600. In this case, the authorization code is a six digit code ("193645"). However, different embodiments may use different lengths of code, may include alphanumeric codes (e.g., "19AZ6Q9"), or may use other types of codes (e.g., visual codes that the requesting device is required to capture using a camera, audio codes that the requesting device is required to capture using a microphone, etc.). The user enters the code on the requesting device 600 while the accepting device 650 awaits the next stage in the process. In some cases, a similar UI is provided for inputting the second factor authentication code when the requesting device is only logging into the centralized services account. However, if the requesting device is a legacy device (which may not be able to perform the combined process), the UI for entering such a code will not be available. In some such embodiments, the user can enter the password and authentication code at the same time, as a single string. In addition, in some such embodiments, the authentication servers send to the device that is providing the second factor authentication code a notification as a reminder or with instructions regarding how to enter this code on the legacy device.

At this point, the user interaction required for allowing the requesting device 600 to join the synchronization group and the cloud services account is complete. The devices perform the rest of the flow shown in FIG. 3, with the requesting device 600 sending proof of the entered code along with its peer identity for synchronization group joining, the accepting device 650 sending a new second factor authentication code to the requesting device, the requesting device using this code to log into to the cloud services account, and the requesting device then using its now pre-approved peer identity to join the synchronization group. Thus, the sixth stage 630 illustrates that the requesting device 600 has joined both the synchronization group and the cloud services account, and the accepting device 650 is operating normally.

II. Differentiating Between Types of Random Codes

In some embodiments, rather than the combined synchronization group joining and centralized entity authentication process, the user can carry the second code from the accepting device to the requesting device, and use the code only as a second factor for authentication with the centralized entity. In order for the accepting device to determine whether this code is the first type of code (not reproducible by the centralized entity, used for the combined process) or the second type of code (reproducible by the centralized entity, used only for the authentication process), some embodiments use a marker in the code (e.g., one of the digits) that specifies which type of code it is.

For instance, the user might not want a new device to join the synchronization group, or the accepting device providing the code might be offline and unable to communicate with the new device. In other cases, the user might want to participate in the combined group joining process, but due to connections or various other issues, the second PAKE message does not reach the new device when the user requests a random code on a potential accepting device. In some embodiments, the devices provide a fallback mechanism for only have the new device be authenticated for the centralized entity when the accepting device is offline (i.e., does not receive the first PAKE message). For instance, if the first PAKE message is not received by the accepting device and the user requests a randomized authentication code on the device, then the device will provide the user with a second factor authentication code verifiable by the authentication servers, and will not send the second PAKE message to the requesting device.

If the new device incorrectly proceeds as if an entered second factor authentication code is a combined synchronization group and account joining code and therefore sends it to the other devices, this only poses the minor inconvenience of making it slightly more of a hassle to log into the cloud services account. However, if the device proceeds as if an entered code is a second factor authentication code when the code is actually supposed to be used for synchronization group joining as well, this results in the centralized entity gaining a code that can be used (if the centralized entity is taken over by a malicious entity) to join the synchronization group and access the user's secure data.

Thus, some embodiments use a flag at the accepting device to determine whether an input code is for second factor authentication only or for the combined account authorization and group joining process. Some embodiments use a check box or similar mechanism in the UI to allow the user to indicate what type of code she is entering. In other embodiments, in order to avoid complicating matters for the user, an extra digit is used in the code as a flag to indicate which type of code is entered.

Figure 7:
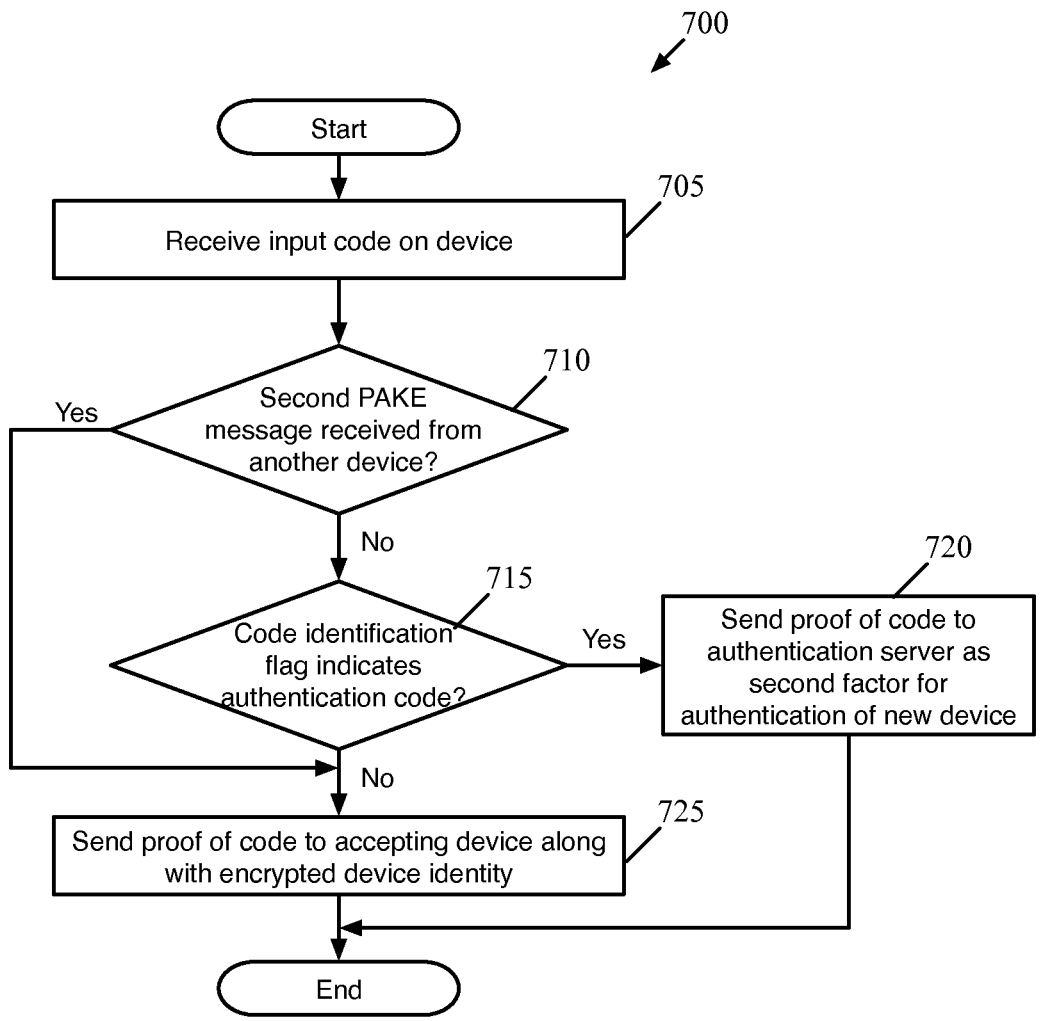
FIG. 7 conceptually illustrates a process of some embodiments performed by a requesting device to determine whether a code input on the device is a second factor authentication code or a combined account verification and synchronization group joining code.

FIG. 7 conceptually illustrates a process 700 of some embodiments performed by a requesting device to determine whether a code input on the device is a second factor authentication code or a combined account verification and synchronization group joining code. As shown, the process begins by receiving (at 705) the input code on the device. As described above, this may take place during device setup, as the user carries a code from an accepting device to the requesting device.

The process then determines (at 710) whether a second PAKE message (i.e., a challenge request for a code, the message 330 in FIG. 3) has been received from any possible accepting device. If such a message has been received, then in some embodiments the device always assumes that the input code is for the combined process, and will not send the code to the authentication server as a matter of precaution. In this case, the process 700 proceeds to operation 720, described below.

If the second PAKE message is not received, then the input code could be a second factor authentication code only. As such, the process determines (at 715) whether the code identification flag indicates that the code is only for second factor authentication. As mentioned, this could be based on user input (e.g., via a checkbox or similar UI mechanism) in some embodiments. In other embodiments, the flag is built into the code itself. For instance, the flag could be simple (e.g., if 0-4, authentication code; if 5-9, combined process code). However, if the user were to make an error typing this one digit, the code would be incorrectly categorized.

As such, some embodiments use a checksum digit designed to prevent the most common input errors from resulting in the incorrect classification of a random combined process code as a second factor authentication code. Specifically, some embodiments use a code with six digits (C0) that are either a random code or a second factor authentication code, and a seventh digit that is a checksum. The checksum digit C1 is determined such that C1=checksum(C0, f), where f=0 for second factor authentication and f=1 for combined process. The requesting device determines which type of code has been entered (and therefore which process to follow) based on evaluating the condition:

if (checksum(C0,0) == C1) → second factor authentication;
else → combined account verification and sync group joining;

That is, if the checksum of the first six digits along with a 0 matches the last digit, then the requesting device uses the code as only a second factor authentication code. Otherwise, it uses the code as a randomized code for the combined process. This errs in the direction of safety, only sending a code to the authentication servers if the code is very likely to be correct Returning to the process 700, if the code identification flag (e.g., checksum calculation) indicates that the entered code is highly likely to be an authentication-only code, then the process sends (at 720) a proof of the code (e.g., the code in encrypted form, a value derived from the code) to the authentication server as a second authentication factor.

Assuming the code (and username/password information) is entered correctly, this leads to the authentication server verifying the device for the centralized services account.

On the other hand, when the code identification flag indicates that the entered code should not be used as an authentication-only code (e.g., because the checksum calculation identifies the code as not a correctly entered authentication-only code, or as a combined process code), the process 700 sends (at 725) a proof of the code to the accepting device along with the encrypted device identity to be used for the combined authentication and synchronization group joining process.

III. Device Software Architecture

Figure 8:
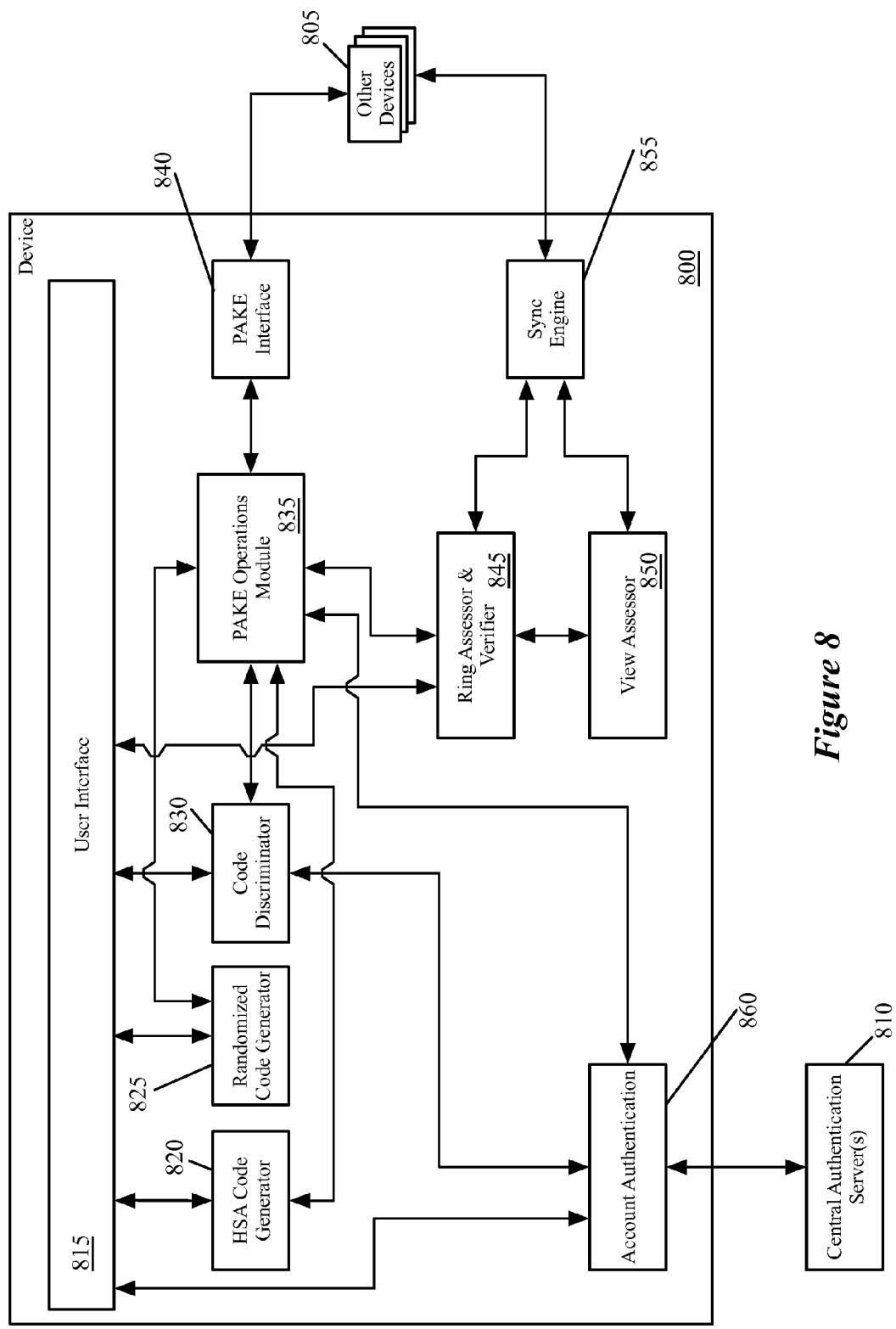
FIG. 8 conceptually illustrates the software architecture of a device of some embodiments that can act as either an accepting device or requesting device for the combined cloud services account authorization and synchronization group joining process.

FIG. 8 conceptually illustrates the software architecture of a device 800 of some embodiments that can act as either an accepting device or requesting device for the combined cloud services account authorization and synchronization group joining process of some embodiments. In addition, the device 800 is also capable of providing second factor authentication codes as an offline accepting device or performing an authentication-only process to log into the cloud services account without joining a synchronization group. This figure also illustrates a set of other devices 805 that are associated with the same centralized services account (i.e., with the same user), as well as a set of central authentication servers 810 for the centralized services (e.g., a cloud services platform). These devices may be any different type of electronic device that is capable of storing data and communicating with a network. For instance, these devices may include smartphones, tablets, laptop and/or desktop computers, smart watches, set top boxes (either separate from or integrated into a television), virtual devices operating on another device (e.g., virtual machines), etc.

As shown, the software architecture of the device 800 (as relates to the authentication and synchronization functions) includes a user interface 815, a HSA code generator 820, a randomized code generator 825, a code discriminator 830, a PAKE operations module 835, a PAKE interface 840, a ring assessor & verifier module 845, a view assessor 850, a synchronization engine 855, and an account authentication module 860. Though not shown, the device 800 also includes various operating system level functions, including one or more networking modules that enable the connections with the other devices 805 and the central authentication servers 810, a display module for outputting the user interface to a display (which may be integrated with the device or be a separate device), and one or more input modules for receiving user input (e.g., through a touchscreen, cursor controller, keyboard, touchpad, etc.).

The user interface 815 enables the user to interact with the device through these one or more input devices. The user interface, in some embodiments, is responsible for generating the display output to the display device, which allows the user to (i) input authentication credentials, such as a username and password, (ii) view both codes for the combined account authorization and synchronization group joining process as well as codes only used for second factor authentication, and (iii) input these codes when viewed on another device (among numerous other interactions available through the user interface of some embodiments).

The HSA code generator 820 and the randomized code generator 825 provide different types of codes to the user interface depending on the situation. For example, the HSA code generator 820 provides second factor authentication codes. When the user requests such a code through the user interface 815, the HSA code generator 820 generates a code and provides this to the user interface for display to the user.

In addition, when the device 800 is acting as an accepting device for the combined process, the PAKE operations module 835 of some embodiments requests a code from the HSA code generator 825 once the requesting device has validated a randomized code. The HSA code generator 825 generates codes according to seed data that is also known to the central authentication servers 860, such that these codes can be verified when input on another device.

The randomized code generator 825 generates randomized codes for the combined account verification and authorization process. When either the user (through the UI 815) or the PAKE operations module 835 (after receiving a first PAKE message from a requesting device) specify for the randomized code generator 825 to generate a random code, the generator 825 generates a code and provides this information to the user interface for display to the user. The code is also provided to the PAKE operations module 835 so that it can be used in the various PAKE-related calculations and key generation described above, and so that a response from the requesting device with proof of the generated code can be verified. In some embodiments, the randomized codes are generated based on data not reproducible by the central authentication servers or any other device.

The code discriminator 830 operates on codes input through the user interface 815 when the device 800 is acting as a requesting device to attempt to gain access to the central services account and/or the synchronization group. When the user inputs a code through the UI 815, the code discriminator 830 of some embodiments determines whether the code is a combined process code or a second factor authentication code (i.e., which code generator on an accepting device generated the input code). In some embodiments, the code discriminator performs the checksum calculations as described above by reference to FIG. 7 in order to determine which type of code is input. If the code can be confidently determined as a second factor authentication code, the code discriminator passes the data to the account authentication module 860 for communication with the central authentication server 810. However, if the code discriminator 830 determines that the input code is a combined process code, then the code is passed to the PAKE operations module 835 so that a proof of the code can be generated and sent to the accepting device as the second PAKE message.

The PAKE operations module 835 of some embodiments performs the various operations for the combined account authorization and synchronization group joining process, as either a requesting device or an accepting device. As a requesting device, the PAKE operations module generates the initial PAKE message with the client public key A, extracts data from the second PAKE message with the server public key B, computes the shared session key, and generates the third PAKE message, which includes generating proof of the code input through the user interface 815. In addition, in some embodiments the PAKE operations module 835 (or a separate encryption/decryption function using the key generated by the PAKE operations module 835) encrypts the peer identity and decrypts the second factor authentication code to pass the decrypted code to the account authentication module 835.

As an accepting device, the PAKE operations module receives the initial PAKE message and extracts the client public key A, generates the second PAKE message including the server public key B (based in part on a code received from the randomized code generator 825), computes the shared session key, and verifies the proof of the code sent with a received third PAKE message. In addition, in some embodiments the PAKE operations module 835 (or a separate encryption/decryption function using the key generated by the PAKE operations module 835) decrypts the peer identity for automatic approval and passes this information to the ring assessor and verifier 845, and encrypts a second factor authentication code (received from the HSA code generator 820) to send to the requesting device. The PAKE interface 840 handles the sending and receiving of these PAKE messages, as well as any necessary error messages, in some embodiments.

The account authentication module 860 handles the account authentication process with the central authentication server. The account authentication module 860 receives username and password information from the user interface, and in some embodiments provides information about the other devices 805 received from the server, so that the PAKE operations module 835 and interface 840 can send the PAKE messages to the correct devices. In other embodiments, the PAKE interface is actually part of the authentication module 860 and the entire PAKE process takes place through the set of authentication servers 810. The authentication module 860 also receives a second factor authentication code (either through the user interface 815 for an account authentication only process or through the PAKE operations module 835 in the case of the combined process), and sends this code to the central authentication servers 810 to complete the account authentication process.

The ring assessor and verifier 845 of some embodiments handles the synchronization group application generation (for requesting devices) and verification (for accepting devices). In some embodiments, the devices use both verification sub-groups and synchronization sub-groups, also referred to as rings and views. Devices join a ring (verification sub-group) by applying to be in the ring and by proving certain requirements for the ring. Devices can then participate in views based on their ring membership, with different views synchronizing different secure data. In the examples described above, the synchronization group to which the requesting device applies as part of the combined account authorization and group joining process is actually a ring, membership in which allows participation in a particular view for sharing at least some of the user's secure data. The requirements for the particular ring entail both possession of the account credentials and user approval on the accepting device. In this case, the user approval is accepted based on the user entering the randomized code on the requesting device and the PAKE module verifying this code.

The ring assessor and verifier 845 on a requesting device generates the ring application using the device's peer identity and the private signing keys derived from the account password and device-specific seed data. On the accepting device, the ring assessor and verifier 845 verifies these signatures, and automatically accepts the application (so long as the signatures are verified) based on the peer identity being the same as that received for auto-acceptance from the PAKE operations module 835. In addition, the ring assessor and verifier of some embodiments may generate applications (and verify such applications) for all sorts of rings.

The view assessor receives ring status information for both the device 800 and the other devices 805, and identifies in which views each of the devices participate. The view assessor provides this data to the synchronization engine 855, which handles the synchronization of the user's secure data with the other devices 805 according to the mapping of views to devices provided by the view assessor 850. In the case in which there is only one ring (and therefore one view) for all the devices associated with an account, the ring assessor and verifier 845 and the view assessor 850 may be a single synchronization group assessor and verifier module. The rings and views of some embodiments are described in greater detail in U.S. Provisional Patent Applications 62/168,893 and 62/172,127, as well as U.S. Patent Publication 2014/0281540 and concurrently filed U.S. patent application Ser. No. 14/872,013, entitled "Synchronization and Verification Groups Among Related Devices", all of which are incorporated by reference above.

IV. Electronic System

Many of the above-described features and applications are implemented as software processes that are specified as a set of instructions recorded on a computer readable storage medium (also referred to as computer readable medium). When these instructions are executed by one or more computational or processing unit(s) (e.g., one or more processors, cores of processors, or other processing units), they cause the processing unit(s) to perform the actions indicated in the instructions. Examples of computer readable media include, but are not limited to, CD-ROMs, flash drives, random access memory (RAM) chips, hard drives, erasable programmable read-only memories (EPROMs), electrically erasable programmable read-only memories (EEPROMs), etc. The computer readable media does not include carrier waves and electronic signals passing wirelessly or over wired connections.

In this specification, the term "software" is meant to include firmware residing in read-only memory or applications stored in magnetic storage which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

A. Mobile Device

Figure 9:
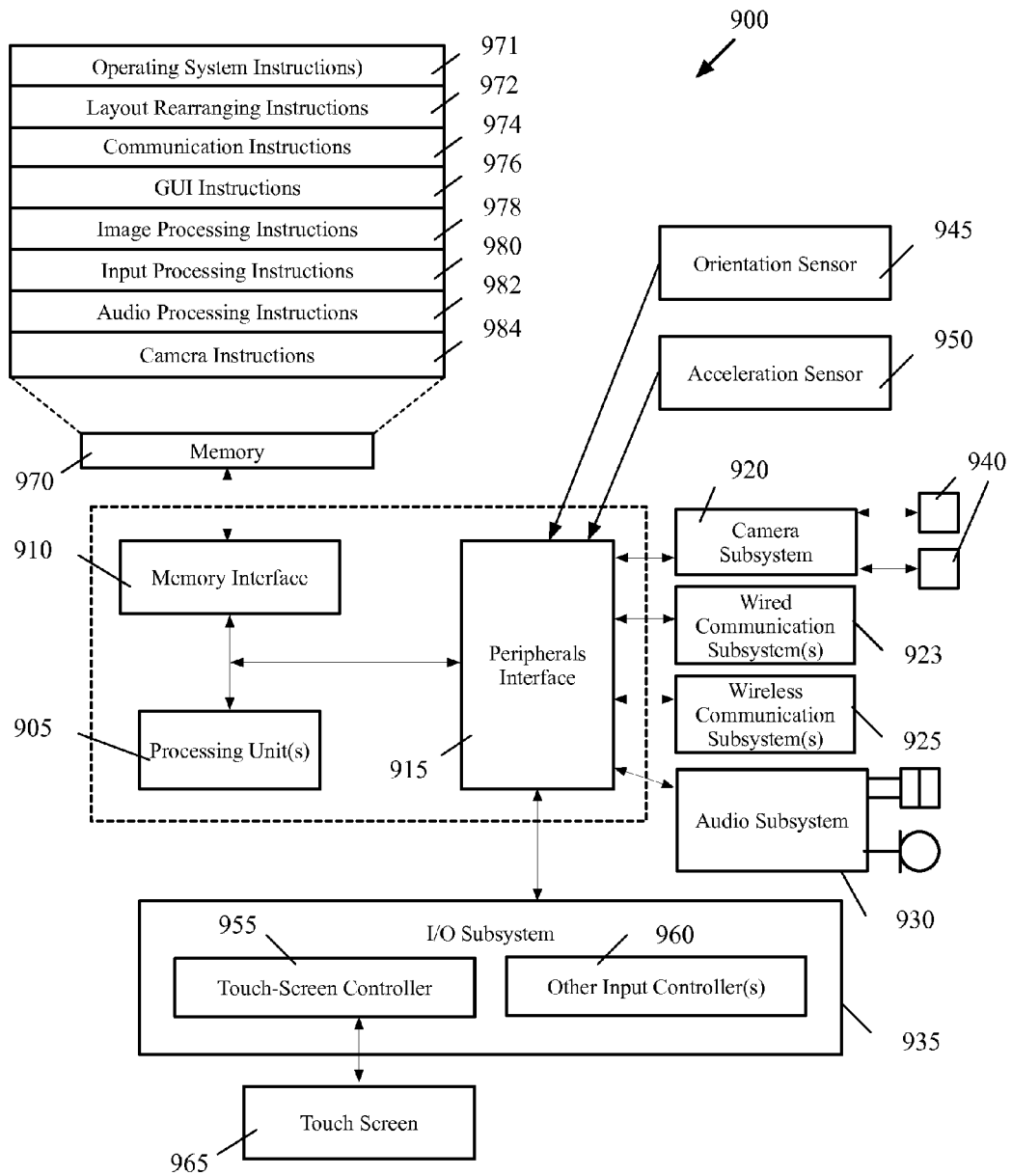
FIG. 9 illustrates an example of an architecture of a mobile computing device with which some embodiments are implemented.

The user data sharing of some embodiments occurs on mobile devices, such as smart phones (e.g., iPhones®) and tablets (e.g., iPads®). FIG. 9 is an example of an architecture 900 of such a mobile computing device. As shown, the mobile computing device 900 includes one or more processing units 905, a memory interface 910 and a peripherals interface 915.

The peripherals interface 915 is coupled to various sensors and subsystems, including a camera subsystem 920, a wired communication subsystem(s) 923, a wireless communication subsystem(s) 925, an audio subsystem 930, an I/O subsystem 935, etc. The peripherals interface 915 enables communication between the processing units 905 and various peripherals. For example, an orientation sensor 945 (e.g., a gyroscope) and an acceleration sensor 950 (e.g., an accelerometer) is coupled to the peripherals interface 915 to facilitate orientation and acceleration functions.

The camera subsystem 920 is coupled to one or more optical sensors 940 (e.g., a charged coupled device (CCD) optical sensor, a complementary metal-oxide-semiconductor (CMOS) optical sensor, etc.). The camera subsystem 920 coupled with the optical sensors 940 facilitates camera functions, such as image and/or video data capturing. The wired communication subsystem 923 and wireless communication subsystem 925 serve to facilitate communication functions.

In some embodiments, the wireless communication subsystem 925 includes radio frequency receivers and transmitters, and optical receivers and transmitters (not shown in FIG. 9). These receivers and transmitters of some embodiments are implemented to operate over one or more communication networks such as a GSM network, a Wi-Fi network, a Bluetooth network, etc. The audio subsystem 930 is coupled to a speaker to output audio (e.g., to output voice navigation instructions). Additionally, the audio subsystem 930 is coupled to a microphone to facilitate voice-enabled functions in some embodiments.

The I/O subsystem 935 involves the transfer between input/output peripheral devices, such as a display, a touch screen, etc., and the data bus of the processing units 905 through the peripherals interface 915. The I/O subsystem 935 includes a touch-screen controller 955 and other input controllers 960 to facilitate the transfer between input/output peripheral devices and the data bus of the processing units 905. As shown, the touch-screen controller 955 is coupled to a touch screen 965. The touch-screen controller 955 detects contact and movement on the touch screen 965 using any of multiple touch sensitivity technologies. The other input controllers 960 are coupled to other input/control devices, such as one or more buttons. Some embodiments include a near-touch sensitive screen and a corresponding controller that can detect near-touch interactions instead of or in addition to touch interactions.

The memory interface 910 is coupled to memory 970. In some embodiments, the memory 970 includes volatile memory (e.g., high-speed random access memory), non-volatile memory (e.g., flash memory), a combination of volatile and non-volatile memory, and/or any other type of memory. As illustrated in FIG. 9, the memory 970 stores an operating system (OS) 971. The OS 971 includes instructions for handling basic system services and for performing hardware dependent tasks.

The memory 970 also includes communication instructions 974 to facilitate communicating with one or more additional devices (e.g., for peer-to-peer data sharing, or to connect to a server through the Internet for cloud-based data sharing); graphical user interface instructions 976 to facilitate graphic user interface processing; image processing instructions 978 to facilitate image-related processing and functions; input processing instructions 980 to facilitate input-related (e.g., touch input) processes and functions; audio processing instructions 982 to facilitate audio-related processes and functions; and camera instructions 984 to facilitate camera-related processes and functions. The instructions described above are merely exemplary and the memory 970 includes additional and/or other instructions in some embodiments. For instance, the memory for a smartphone may include phone instructions to facilitate phone-related processes and functions. The above-identified instructions need not be implemented as separate software programs or modules. Various functions of the mobile computing device can be implemented in hardware and/or in software, including in one or more signal processing and/or application specific integrated circuits.

While the components illustrated in FIG. 9 are shown as separate components, one of ordinary skill in the art will recognize that two or more components may be integrated into one or more integrated circuits. In addition, two or more components may be coupled together by one or more communication buses or signal lines. Also, while many of the functions have been described as being performed by one component, one of ordinary skill in the art will realize that the functions described with respect to FIG. 9 may be split into two or more integrated circuits.

B. Computer System

Figure 10:
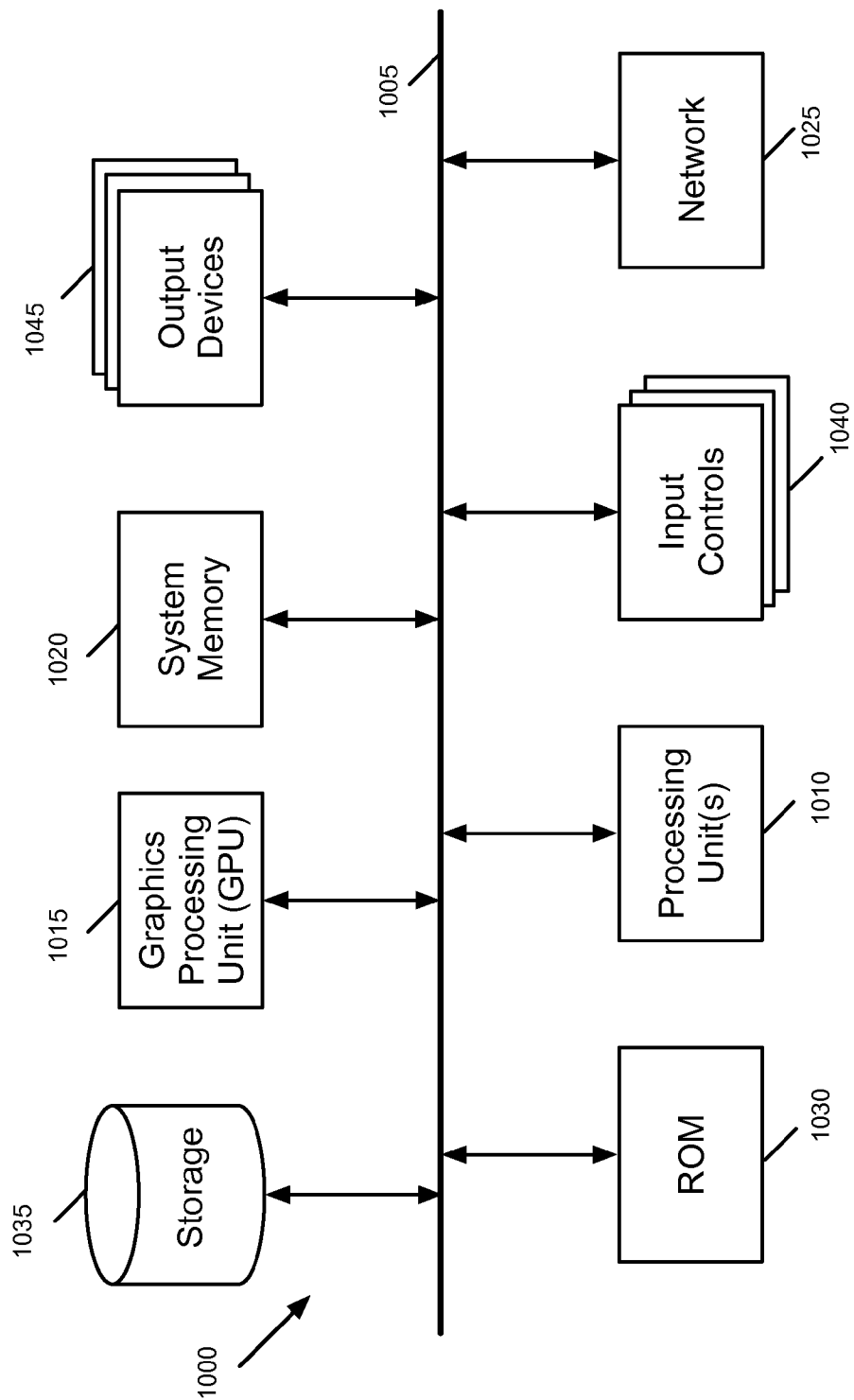
FIG. 10 conceptually illustrates another example of an electronic system with which some embodiments of the invention are implemented.

FIG. 10 conceptually illustrates another example of an electronic system 1000 with which some embodiments of the invention are implemented. The electronic system 1000 may be a computer (e.g., a desktop computer, personal computer, tablet computer, etc.), phone, PDA, or any other sort of electronic or computing device. Such an electronic system includes various types of computer readable media and interfaces for various other types of computer readable media. Electronic system 1000 includes a bus 1005, processing unit(s) 1010, a graphics processing unit (GPU) 1015, a system memory 1020, a network 1025, a read-only memory 1030, a permanent storage device 1035, input devices 1040, and output devices 1045.

The bus 1005 collectively represents all system, peripheral, and chipset buses that communicatively connect the numerous internal devices of the electronic system 1000. For instance, the bus 1005 communicatively connects the processing unit(s) 1010 with the read-only memory 1030, the GPU 1015, the system memory 1020, and the permanent storage device 1035. From these various memory units, the processing unit(s) 1010 retrieves instructions to execute and data to process in order to execute the processes of the invention. The processing unit(s) may be a single processor or a multi-core processor in different embodiments. Some instructions are passed to and executed by the GPU 1015. The GPU 1015 can offload various computations or complement the image processing provided by the processing unit(s) 1010. In some embodiments, such functionality can be provided using CoreImage's kernel shading language.

The read-only-memory (ROM) 1030 stores static data and instructions that are needed by the processing unit(s) 1010 and other modules of the electronic system. The permanent storage device 1035, on the other hand, is a read-and-write memory device. This device is a non-volatile memory unit that stores instructions and data even when the electronic system 1000 is off. Some embodiments of the invention use a mass-storage device (such as a magnetic or optical disk and its corresponding disk drive, integrated flash memory) as the permanent storage device 1035.

Other embodiments use a removable storage device (such as a floppy disk, flash memory device, etc., and its corresponding drive) as the permanent storage device. Like the permanent storage device 1035, the system memory 1020 is a read-and-write memory device. However, unlike storage device 1035, the system memory 1020 is a volatile read-and-write memory, such a random access memory. The system memory 1020 stores some of the instructions and data that the processor needs at runtime. In some embodiments, the invention's processes are stored in the system memory 1020, the permanent storage device 1035, and/or the read-only memory 1030. For example, the various memory units include instructions for processing multimedia clips in accordance with some embodiments. From these various memory units, the processing unit(s) 1010 retrieves instructions to execute and data to process in order to execute the processes of some embodiments.

The bus 1005 also connects to the input and output devices 1040 and 1045. The input devices 1040 enable the user to communicate information and select commands to the electronic system. The input devices 1040 include alphanumeric keyboards and pointing devices (also called "cursor control devices"), cameras (e.g., webcams), microphones or similar devices for receiving voice commands, etc. The output devices 1045 display images generated by the electronic system or otherwise output data. The output devices 1045 include printers and display devices, such as cathode ray tubes (CRT) or liquid crystal displays (LCD), as well as speakers or similar audio output devices. Some embodiments include devices such as a touchscreen that function as both input and output devices.

Finally, as shown in FIG. 10, bus 1005 also couples electronic system 1000 to a network 1025 through a network adapter (not shown). In this manner, the computer can be a part of a network of computers (such as a local area network ("LAN"), a wide area network ("WAN"), or an Intranet), or a network of networks, such as the Internet. Any or all components of electronic system 1000 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself. In addition, some embodiments execute software stored in programmable logic devices (PLDs), ROM, or RAM devices.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

While the invention has been described with reference to numerous specific details, one of ordinary skill in the art will recognize that the invention can be embodied in other specific forms without departing from the spirit of the invention. For instance, a number of the figures (including FIGS. 4, 5, and 7) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

We claim:

1. A method for a first device, the method for joining a group of related devices:
    receiving input of a password for authorization with a centralized entity;
    receiving input of a first code generated on a second device already established in the group of related devices, wherein the second device is previously authorized with the centralized entity as a valid device for a particular account with the centralized entity, the second device is separate from the centralized entity, and the group of related devices is exclusive of the centralized entity;
    using, by the first device, the password and the first code to authenticate with at least one device of the group of related devices to join the group of related devices in order to synchronize user data with the devices in the group of related devices; and
    using, by the first device, the password and a second code to authenticate with the centralized entity to authorize the first device as another valid device for the particular account with the centralized entity, the second code being received from the at least one device upon authenticating with the at least one device to join the group of related devices.

2. The method of claim 1, wherein the centralized entity is a cloud services provider and the particular account is a cloud services account with the cloud services provider.

3. The method of claim 2, wherein the password is a password for the particular account with the cloud services provider.

4. The method of claim 1, wherein the first code is randomly generated by the second device in a manner not reproducible by the centralized entity.

5. The method of claim 1, wherein the first code generated by the second device comprises a numeric or alphanumeric string.

6. The method of claim 5, wherein one character of at least one of the first code or the second code specifies whether the code is used for (i) joining the group of related devices or (ii) authorization with the centralized entity.

7. The method of claim 1, wherein the second code is generated in a manner reproducible by the centralized entity.

8. The method of claim 6, wherein the one character is a checksum character generated based on other characters of the code.

9. The method of claim 1, wherein using the password and the first code to join the group of related devices in order to synchronize user data comprises:
    generating a cryptographic key based at least on the password; and
    sending proof of the first code, that was generated on the second device, to the second device along with an identity of the first device encrypted with the cryptographic key.

10. The method of claim 9 further comprising, after using the password and second code to authorize the first device with the centralized entity, using the identity of the first device for an application to join the group of related devices.

11. The method of claim 10, wherein the second device automatically approves the application of the first device with no additional user input based on identity of the first device previously sent with the proof of the first code input on the first device.

12. The method of claim 9, wherein the cryptographic key is a first cryptographic key, and using the password and the second code to authorize the first device with the centralized entity comprises:
   receiving the second code from the second device encrypted with a second cryptographic key, the second code generated by the second device and derivable by the centralized entity; and
   sending a proof of the second code to the centralized entity as a second authentication factor in addition to the password in order to authorize the first device with the centralized entity.

13. The method of claim 12, wherein the first and second cryptographic keys are related.

14. The method of claim 12, wherein the first and second cryptographic keys are the same.

15. The method of claim 1, wherein the first code generated by the second device comprises a visual code displayed on the second device and receiving input of the first code comprises capturing an image of the first code displayed on the second device with a camera of the first device.

16. A machine readable medium of a first device storing a program which when executed by at least one processing unit of the first device joins the first device into a group of related devices, the program comprising sets of instructions for:
   receiving input of a password for authorization with a centralized entity;
   receiving input of a first code generated by a second device already established in the group of related devices; and
   using the password and the first code to (i) join the group of related devices in order to synchronize user data with the devices in the group of related devices by generating a first cryptographic key based at least on the password and sending proof of the first code to the second device along with an identity of the first device encrypted with the first cryptographic key and (ii) authorize the first device with the centralized entity as a valid device for a particular account with the centralized entity by receiving a second code from the second device encrypted with a second cryptographic key, the second code generated by the second device and derivable by the centralized entity, and sending a proof of the second code to the centralized entity as a second authentication factor.

17. The machine readable medium of claim 16, wherein the centralized entity is a cloud services provider and the particular account is a cloud services account with the cloud services provider.

18. The machine readable medium of claim 16, wherein the first code is randomly generated by the second device in a manner not reproducible by the centralized entity.

19. The machine readable medium of claim 16, wherein the set of instructions for using the password and first code further comprises, after authorizing the first device with the centralized entity, using the identity of the first device for an application to join the group of related devices, wherein the second device automatically approves the application of the first device with no additional user input based on the identity of the first device previously sent with the proof of the first code input on the first device.

20. A first electronic device comprising:
   a set of processing units; and
   a machine readable medium storing a program which when executed by at least one of the processing units joins the first electronic device into a group of related devices, the program comprising sets of instructions for:
      receiving input of a password for authorization with a centralized entity;
      receiving input of a first code generated by a second electronic device already established in the group of related devices; and
      using both the password and the first code to join the group of related devices in order to synchronize user data with the devices in the group of related devices and separately using at least the password and a second code to authorize the first electronic device with the centralized entity as a valid device for a particular account with the centralized entity, the second code being received from one of the group of related devices upon joining the group of related devices using both the password and the first code.

21. The first electronic device of claim 20, wherein the first code is randomly generated by the second electronic device in a manner not reproducible by the centralized entity.

22. The first electronic device of claim 20, wherein the set of instructions for using the password and the first code to join the group of related devices in order to synchronize user data comprises sets of instructions for:
   generating a cryptographic key based at least on the password; and
   sending proof of the first code to the second electronic device along with an identity of the first electronic device encrypted with the cryptographic key.

23. The first electronic device of claim 22, wherein the program further comprises, after using the password and first code to authorize the first electronic device with the centralized entity, using the identity of the first electronic device for an application to join the group of related devices, wherein the second electronic device automatically approves the application of the first electronic device with no additional user input based on identity of the first electronic device previously sent with the proof of the first code input on the first electronic device.

* * * * *